(12) United States Patent
Smotkin

(10) Patent No.: US 7,923,165 B2
(45) Date of Patent: Apr. 12, 2011

(54) ELECTROLYTE COMPONENTS FOR USE IN FUEL CELLS

(75) Inventor: Eugene S. Smotkin, Chicago, IL (US)

(73) Assignee: Nuvant Systems, LLC, Honolulu, HI (US)

( * ) Notice: Subject to any disclaimer, the term of this patent is extended or adjusted under 35 U.S.C. 154(b) by 1206 days.

(21) Appl. No.: 09/891,200

(22) Filed: Jun. 26, 2001

(65) Prior Publication Data

US 2002/0031695 A1    Mar. 14, 2002

Related U.S. Application Data

(60) Provisional application No. 60/222,128, filed on Jul. 31, 2000, provisional application No. 60/244,208, filed on Oct. 31, 2000.

(51) Int. Cl.
*H01M 8/10*    (2006.01)
(52) U.S. Cl. .................. 429/491; 429/495; 427/115
(58) Field of Classification Search .............. 429/30, 429/33, 46, 41; 427/115, 58, 156; 252/62.2; 264/241; 204/194, 295; 428/548, 40.9, 432, 428/433, 688, 693
See application file for complete search history.

(56) References Cited

U.S. PATENT DOCUMENTS

| | | | |
|---|---|---|---|
| 4,820,386 A | | 4/1989 | LaConti et al. |
| 5,094,927 A | * | 3/1992 | Baucke et al. .................. 429/33 |
| 5,658,681 A | | 8/1997 | Sato et al. |
| 5,759,712 A | | 6/1998 | Hockaday |
| 5,830,343 A | | 11/1998 | Hintsche et al. |
| 5,846,669 A | * | 12/1998 | Smotkin et al. ................ 429/41 |
| 5,856,036 A | | 1/1999 | Smotkin et al. |
| 5,863,395 A | | 1/1999 | Mah et al. |
| 5,879,828 A | | 3/1999 | Debe et al. |
| 5,985,113 A | | 11/1999 | Crome et al. |
| 6,083,636 A | * | 7/2000 | Hsu .................... 429/13 |
| 6,136,412 A | | 10/2000 | Spiewak et al. |
| 6,156,184 A | | 12/2000 | Antonucci et al. |
| RE37,042 E | | 2/2001 | Trainham, III et al. |
| 6,183,895 B1 | | 2/2001 | Kudo et al. |
| 6,187,164 B1 | | 2/2001 | Warren et al. |
| 2002/0034672 A1 | * | 3/2002 | Saito et al. ..................... 429/34 |

FOREIGN PATENT DOCUMENTS

| | | |
|---|---|---|
| FR | 1553361 | 1/1969 |
| JP | 62122071 | 6/1987 |
| WO | WO 98/21777 | 5/1998 |

OTHER PUBLICATIONS

A. Hartner et al., "Methanol in-situ reforming fuel cells", Proc. AICHE-I. Chem. I. Joint Meet., London, 1965 (abstract).
T. Norby, "Solid-state protonic conductors: principles, properties, progress and prospects", Solid State Ionics 125, p. 1-11 1999.
T. Mori et al., "Steam reforming reaction of methane in internally-reformed molten carbonate fuel cell", Journal of the Electrochemical Society, vol. 136, part II, No. 7-12, p. 2230-2233, Jul.-Dec. 1989.
G. Deublein et al., "Hydrogen-transparent metal surfaces produced by use of molten salts with very low oxygen and water activities", The Electrochemical Society, Inc. Meeting Abstracts, vol. 99-I, May 2-6, 1999.
S. Samms et al., "Internal methanol reforming PEM fuel cells", The Electrochemical Society, Inc. Meeting Abstracts, vol. 99-I, May 2-6, 1999.
Pu et al. "A Methanol Impermeable Proton Conducting Composite Electrolyte System" The Electrochemical Society, vol. 142, No. 7, Jul. 1995, pp. L119-L120.
Kenjo et al. "Proton Conductors Based on Ammonium Polyphosphate" Solid State Ionics, vol. 76, 1995, pp. 29-34.
Cappadonia et al. "Preliminary Study on the Ionic Conductivity of a Polyphosphate Composite" Solid State Ionics, vol. 125, 1999, pp. 333-337.
Norby "Solid-State Protonic Conductors: Principles, Properties, Progress and Prospects" Solid State Ionics, vol. 125, 1999, pp. 1-11.
Ryu et al. "Chemical Stability and Proton Conductivity of Doped $BaCeO_3$-$BaZrO_3$ Solid Solutions" Solid State Ionics, vol. 125, 1999, pp. 355-367.
Lybye et al. "Proton and Oxide Ion Conductivity of Doped $LaScO_3$" Solid State Ionics, Vo. 125, 1999, pp. 339-344.
Cook et al., J. Electrochem. Soc. (1992) 139(2):L19-L20.
Office Action for European Application No. 01950404.2, date mailed on Jun. 5, 2007, 4 pages.

* cited by examiner

*Primary Examiner* — Raymond Alejandro
(74) *Attorney, Agent, or Firm* — Morrison & Foerster LLP

(57) ABSTRACT

An electronically insulating proton conductor (C) is adhered or deposited as a film on a dense phase proton permeable material (D) in a thicknees such that the composite C/D has a proton conductivity in a preferred intermediate temperature range of 175-550° C. The composite C/D is incorporated in a high temperature electrolyte membrane electrolyte assembly (MEA), which is incorporated into a fuel cell that can operate in this intermediate temperature range. The fuel cell in turn is incorporated into a fuel cell system having a fuel reformer in the flow field of a fuel mixture entering the fuel cell or in a mode where the fuel cell receives fuel from an external reformer.

8 Claims, 12 Drawing Sheets

A: Porous Gas Diffusion Electrode
B: Electrocatalyst Layer
C: Proton Permeable Electronic Insulator Layer
D: Palladium Membrane

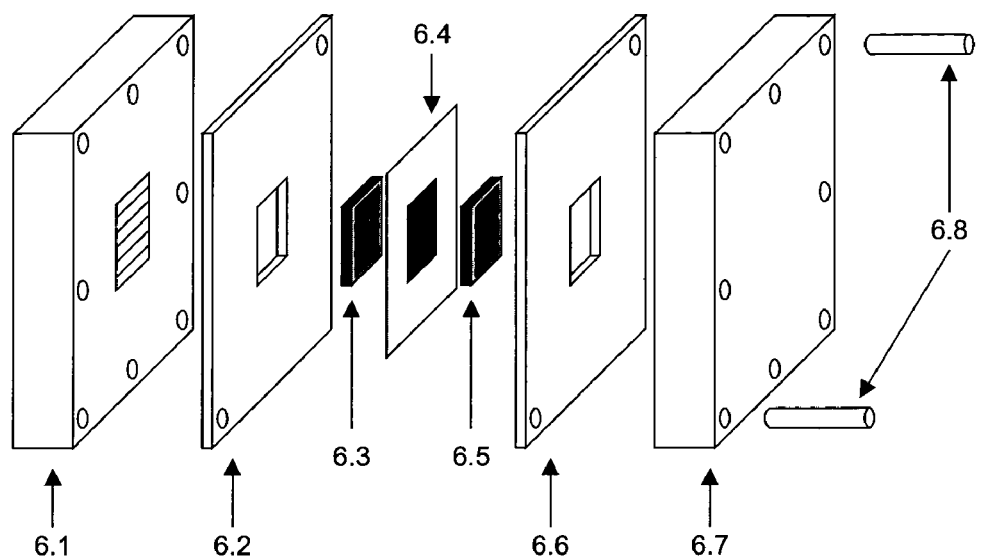

6.1 Graphite block with anode flow field
6.2 PTFE gasket
6.3 Anode: catalyzed gas diffusion layer (carbon cloth)
6.4 Proton Conducting Composite Membrane comprising an electronically insulating proton conductor (hatched section) supported on a metal hydride, i.e., Pd foil (dotted section)
6.5 Cathode: catalyzed gas diffusion layer (carbon cloth)
6.6 PTFE gasket
6.7 Graphite block with cathode flow field
6.8 Alignment pins

Figure 6

ELECTROLYTE COMPONENTS FOR USE IN FUEL CELLS

RELATED APPLICATIONS

This application claims priority from Provisional Application No. 60/222,128 filed Jul. 31, 2000 entitled "Partial Reformate Fuel Cell," Provisional Application Ser. No. 60/244,208 filed Oct. 31, 2000 entitled "A Proton Exchange Membrane, A Partial Reformate Fuel Cell, And A Partial Reformate Fuel Cell System With A Reformer In The Flow Field" and a PCT international application, PCT/US01/20032 filed Jun. 22, 2001, the entire disclosures of which are hereby incorporated herein by reference.

FIELD OF INVENTION

The present invention relates to a composite electrolyte system for use in either stand alone intermediate temperature fuel cell systems or in fuel cell systems with methanol reforming catalysts within the anode compartment. The composite electrolyte system comprises a metal hydride support foil or gauze upon which are supported electronically insulating proton conductors on one or both sides of the support foil.

BACKGROUND

Fuel cells are electrochemical devices that convert the chemical energy of a reaction directly into electrical energy. Chemical energy is the difference between the energy of the starting chemicals and the energy of the product chemicals. A reaction is a process whereby chemicals are transformed from initial chemicals to product chemicals while maintaining the same overall mass. In fuel cells, the reaction at the anode is an oxidation reaction and the reaction at the cathode is a reduction reaction. An oxidation reaction involves the loss of electrons while the gain of electrons is a reduction reaction. A fuel cell is a galvanic cell. A galvanic cell is a device for extracting the energy of a reaction as electrical work. The maximum electrical work is equal to the change in the free energy that occurs when the reactions take place. For example the standard free energy of the reaction $$2H_2(gas) + O_2(gas) \rightarrow 2H_2O \text{ (liquid)}$$

is the change in free energy when 2 moles of pure hydrogen at 1 bar reacts with 1 mole of pure oxygen gas at 1 bar to produce liquid water at the same pressure. The standard free energy change for this reaction is −474.26 kilojoules. That is how much energy is available for non-expansion work, which includes electrical work. A liquid is a condensed phase. The free energy change for a fuel cell reaction such as the formation of water from hydrogen and oxygen is related to the cell potential by the following reaction:

$$\Delta G = nFE$$

where n is the amount of electrons (in moles) transferred between the electrodes when the stoichiometric reaction occurs. F is Faraday's constant of 96500 coulombs per mole and E is the cell voltage. The electrical work that is done when charge travels from the anode to the cathode is equal to the product of the cell voltage and the current driven multiplied by the time of the current draw.

A battery is an energy storage device. The maximum energy available is determined by the amount of chemical reactant stored within the battery itself. The battery will cease to produce electrical energy when the chemical reactants are consumed (i.e., discharged). In a secondary battery, recharging regenerates the reactants, which involves putting energy into the battery from an external source. The fuel cell, on the other hand, is an energy conversion device that theoretically has the capability of producing electrical energy for as long as the fuel and oxidant are supplied to the electrodes. In reality, degradation, primarily corrosion, or malfunction of components limits the practical operating life of fuel cells.

Fuel cells have provided power for space shuttles for a couple of decades. However, the fuel used in the fuel cells used on the space shuttle is pure, liquid hydrogen.

In a conventional fuel cell the electrolyte is catalyzed on both faces of a two dimensional membrane. One face is the anode side where fuel is oxidized and the opposite face is the cathode side where oxygen is reduced. In polymer electrolyte fuel cells, this three-layer system is commonly referred to as a membrane electrode assembly (MEA). The three layers are the polymer electrolyte sandwiched between two catalytic layers.

Gasoline, diesel, methane and alcohols do not have adequate electrochemical reactivity to be used directly in state-of-the-art polymer electrolyte fuel cells (PEFCs) for high power applications. A catalytic-chemical fuel processor is required to convert these fuels to hydrogen-rich fuel gases. Fuel processors for automotive fuel cell engines must be able to start up quickly, follow demand rapidly, and operate efficiently over a wide range of conversion rates. Also, fuel conversion needs to be essentially complete over the entire load range. The carbon monoxide level in the processed fuel entering the stack must be very low to avoid poisoning of the anode electrocatalysts.

The chemical reactions governing fuel processor design for two alternative reactions used in the primary steps to convert methanol, i.e., $H_3COH$, or gasoline (e.g., $H_3C(CH_2)_6CH_3$), are given below:

Steam reforming
(1) $2 H_3COH + H_2O \text{ (steam)} + \text{heat} \rightarrow 5 H_2 + CO + CO_2$
(2) $H_3C(CH_2)_6 CH_3 + 12H_2O \text{ (steam)} + \text{heat} \rightarrow 21 H_2 + 4 CO + 4 CO_2$ Partial oxidation
(3) $2 H_3COH + O_2 \text{ (air)} \rightarrow 3 H_2 + CO + CO_2 + H_2O + \text{heat}$
(4) $H_3C(CH_2)_6 CH_3 + 7\frac{1}{2}O_2 \text{ (air)} \rightarrow 6 H_2 + 4 CO + 4 CO_2 + 3 H_2O + \text{heat}$ The steam reforming reactions described in the above equations require catalysts. The catalysts are incorporated into the catalytic-chemical-fuel processor. For the purposes of this patent application, a reforming catalyst is any catalyst that increases the rate of hydrogen formation. This would include the water-gas-shift catalysts that convert CO and water to hydrogen and $CO_2$. Reaction (1) can be considered a combination of methanol cracking and water-gas-shifting. Reaction one can be broken down into (1A) and (1B).

(1A) $2 H_3COH \rightarrow 2 CO + 4H_2$
(1B) $2 CO + 2 H_2O \rightarrow 2 CO_2 + 2 H_2$ However in practical systems the second reaction does not go to completion. That is why the "reformate" fuel is contaminated with CO. Both (1A) and (1B) require catalysts. (1A) is a methanol cracking reaction while (1B) is the water-gas-shift reaction. Thus for the conversion of methanol to hydrogen, catalysts that activate the cracking reaction, the water-gas-shift catalysts, or dual function catalysts that enable both reactions are all referred to as reforming catalysts. These catalysts can be incorporated into a separate reactor external to a fuel cell or be incorporated in the fuel cell itself. When a catalyst is incorporated in the fuel cell, we refer to this as internal reforming. A reactor or set of reactors that chemically changes a fuel to hydrogen is also called a Syngas generator of reactor. There are always side products produced including $CO_2$ and CO. Other side products may also be produced.

The $H_2$ content in reformed methanol or gasoline is about 0.189 kg or 0.430 kg $H_2$/kg fuel respectively. The reforming process yields $H_2$ diluted with $CO_2$, and low levels of CO. Within the operating temperature (T) range of polymer electrolyte fuel cells, the reformate prior to the water gas shift (WGS) and the preferential oxidation (PROX) reactor contains CO at the pph level, enough to shut down a Pt alloy catalyst. The WGS output contains about 1% CO, still enough to shut down the anode. A PROX unit is used to further reduce the CO content to the approximately 10-ppm tolerance limit of a typical anode catalyst (PtRu). The development of CO tolerant anodes could obviate the need for the PROX and WGS units. Today, there are no anode catalysts that could tolerate the 1% CO content of the WGS reactor output at the operating temperature of a polymer electrolyte fuel cell. The most commonly used anode catalyst is carbon supported PtRu. Alternatives such as PtMo have been studied although stability issues with PtMo require examination. Thus the quest for better catalysts should be augmented by the search for higher temperature electrolyte (HTE) systems. Phosphoric acid fuel cells (PAFCs) do not require a PROX unit because they operate at 200° C. Although CO is not a fuel at 200° C., it is not a poison. However, PAFCs suffer from corrosion problems linked to the phosphoric acid electrolyte.

Other reasons exist for increasing the FC operating temperature, even when using pure $H_2$. At high efficiencies (high cell voltage), the polarization at the anode could be less than 30 mV, yet the cell voltage is hundreds of mV off the thermodynamic value because of cathode polarization (or cathode losses). The four-electron oxygen reduction kinetics would improve significantly if high temperature electrolyte systems were developed. Thus, there are 2 key reasons for developing high temperature electrolyte systems (1) mitigation of CO poisoning and (2) improvements in $O_2$ reduction kinetics. High temperature electrolyte systems would substantially reduce the fuel processor/FC system volume (PROX unit could be eliminated and the water gas shifter could be reduced in size or possibly eliminated). Successful development of high temperature electrolytes would afford relaxation of the output requirements of fuel reformers. The application of such a membrane electrolyte assembly (MEA) at even higher temperatures would have an enormous impact on the design of compact systems for portable, transportation and stationary power.

Solid-state proton conductors are candidates in sensors, batteries, fuel cells, electrolysers, etc. A brief overview of the types and principles of solid state proton conductors and the temperature dependence of those conductors is provided by Norby in "Solid-state prototic conductors: principles, properties, progress and prospects," Solid State Ionics, 125, p.1-11 (1999), which is incorporated herein by reference. Norby states in the Abstract that there is "much needed development of electrodes for high- and intermediate-temperature proton conductors." The above-mentioned issue of Solid State Ionics is the Proceedings of the $9^{th}$ International Conference on Solid State Proton conductors. Included in the proceedings are over 50 articles devoted to solid-state proton conductors.

The state-of-the-art polymer electrolyte fuel cells generally use proton-conducting polymers as the electrolyte membrane in the MEA. The state-of-the art proton conducting polymers are low-temperature conductors operating below 100° C. On the other hand, intermediate and high-temperature proton conductors operate in the temperature ranges of 100-650° C. and 650° C. and more, respectively.

The MEA is the core of the fuel cell. Proton conducting polymers are used as the electrolyte in PEFCs. Nafion™ is an example of a proton-conducting polymer. Although electrolytes for fuel cells are necessarily proton conductors, they do not conduct electrons (i.e. they are electronic insulators). Thus Nafion is an example of an electronically insulating proton conductor (EIPC). An EIPC is a material that conducts protons or hydrogen but does not conduct electrons. PEFCs typically operate at temperatures below 100° C. The upper limit is imposed by properties of the polymer electrolyte (typically perfluorinated sulfonated polymers such as Nafion™) that dehydrates at temperatures above 100° C. The maintenance of water (water management) in the polymer is a requirement for high proton conductivity. As the temperature is increased above the boiling point of water, the polymer membrane dehydrates. The dehydration of the membrane reduces the conductivity.

In state-of-the-art PEFCS, the conductivity decreases as the temperature increases. Specifically, the proton conductivity of Nafion™ decreases as the temperature increases. Typically the thickness of Nafion used in fuel cells is between 2 and 7 mil, where a mil is a thousandth of an inch. Such thick films are free standing films. It is possible to maintain hydration of the membrane by increasing the pressure. Increasing the pressure is a way of effecting water management because the boiling point of water increases with increasing pressure. However, operating a fuel cell at higher pressure requires the use of parasitic energy to operate compressors. Maintenance of higher pressure would reduce the power density of the fuel cell system.

FIG. 1 of the specification is FIG. 1 of Norby. It shows selected literature data for proton conductivity as a function of inverse temperature. Norby states that many classes of proton conductors are represented by members that have protonic conductivities of up to $10^{-3}$–$10^{-2}$ S/cm at some temperature. The proton conductivities shown in FIG. 1 for Nafion, HCl and $H_3PO_4$ solutions are the ranges where these materials are useful as proton conductors.

There are several disadvantages of the Nafion, HCl and $H_3PO_4$ containing proton conductors. Nafion requires water. Phosphoric acid fuel cells have a matrix, e.g., doped polybenzimidazole (PBI) imbibed with phosphoric acid. HCl and $H_3PO_4$ are acids and, therefore, corrosive. The operating temperature of those acids is also limited by their volatility. Also, the anion (or conjugate base) of phosphoric acid (i.e. phosphate) poisons the platinum cathode catalyst.

Norby states that "at higher temperatures the protonic conductivities decrease because of (1) reversible or irreversible loss of vehicle water (e.g., in proton conducting polymers), (2) because of decomposition or melting of hydrates, hydroxides or acid salts, or (3) because of reversible loss of protons (water) from oxides. Thus, proton conductivities are generally functional over relatively narrow temperature ranges."

The units of conductivity are S/cm where S is Siemens. A Siemen is the reciprocal of an ohm (i.e. $1/\Omega$). Referring to FIG. 1, Norby concludes that, "at present, solid proton conductors do not parallel the best oxygen ion conductors (with conductivities>1 S/cm). However, proton conductors, in general, work at substantially lower temperatures and may offer the highest conductivities at intermediate and low temperature. But there are no solid proton conductors working satisfactorily in the gap between, say, 200 and 500° C., as shown in FIG. 1. While the 'gap' may seem small in an Arrhenius plot, it covers a most important and desirable range of operating temperatures for both chemical processes and energy conversion processes. Narrowing this gap is of prime interest in the development of proton conductors for practical applications."

Accordingly, there exists a need for a system having proton conductivity in the "gap" region of FIG. 1. More particularly, there is a need for an electronically insulating proton conductor containing no liquid phase, unlike water in Nafion or $H_3PO_4$ imbibed in a matrix, having proton conductivity in the "gap" region of FIG. 2.

SUMMARY OF THE INVENTION

An embodiment of the present invention is an electronically insulating proton conductor having proton conductivity within the gap of FIG. 1.

Another embodiment is an electronically insulating proton conductor having proton conductivity within the gap of FIG. 2, said electronically insulating proton conductor containing no liquid phase.

Additional embodiments relate to a proton conducting membrane comprising an electronically insulating proton conductor having proton conductivity within the gap of FIG. 1 or comprising a proton conducting membrane comprising proton conductivity within the gap of FIG. 2, said electronically insulating proton conductor containing no liquid phase.

An embodiment of this invention is a fuel cell comprising a proton conducting membrane comprising an electronically insulating proton conductor having proton conductivity within the gap of FIG. 1 or comprising proton conductivity within the gap of FIG. 2, said electronically insulating proton conductor containing no liquid phase.

Another embodiment is a fuel cell system, comprising a fuel reformer and a fuel cell comprising a proton conducting membrane comprising an electronically insulating proton conductor having a proton conductivity within the gap of FIG. 1 or comprising a fuel cell comprising a proton conducting membrane comprising a proton conductivity within the gap of FIG. 2, said electronically insulating proton conductor containing no liquid phase.

Additional advantages of this invention would become readily apparent to those skilled in this art from the following detailed description, wherein only the preferred embodiments of this invention are shown and described, simply by way of illustration of the best mode contemplated for carrying out this invention. As would be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIG. 6 shows a schematic of an embodiment of an intermediate temperature fuel cell assembly.

DETAILED DESCRIPTION

Figure 1:
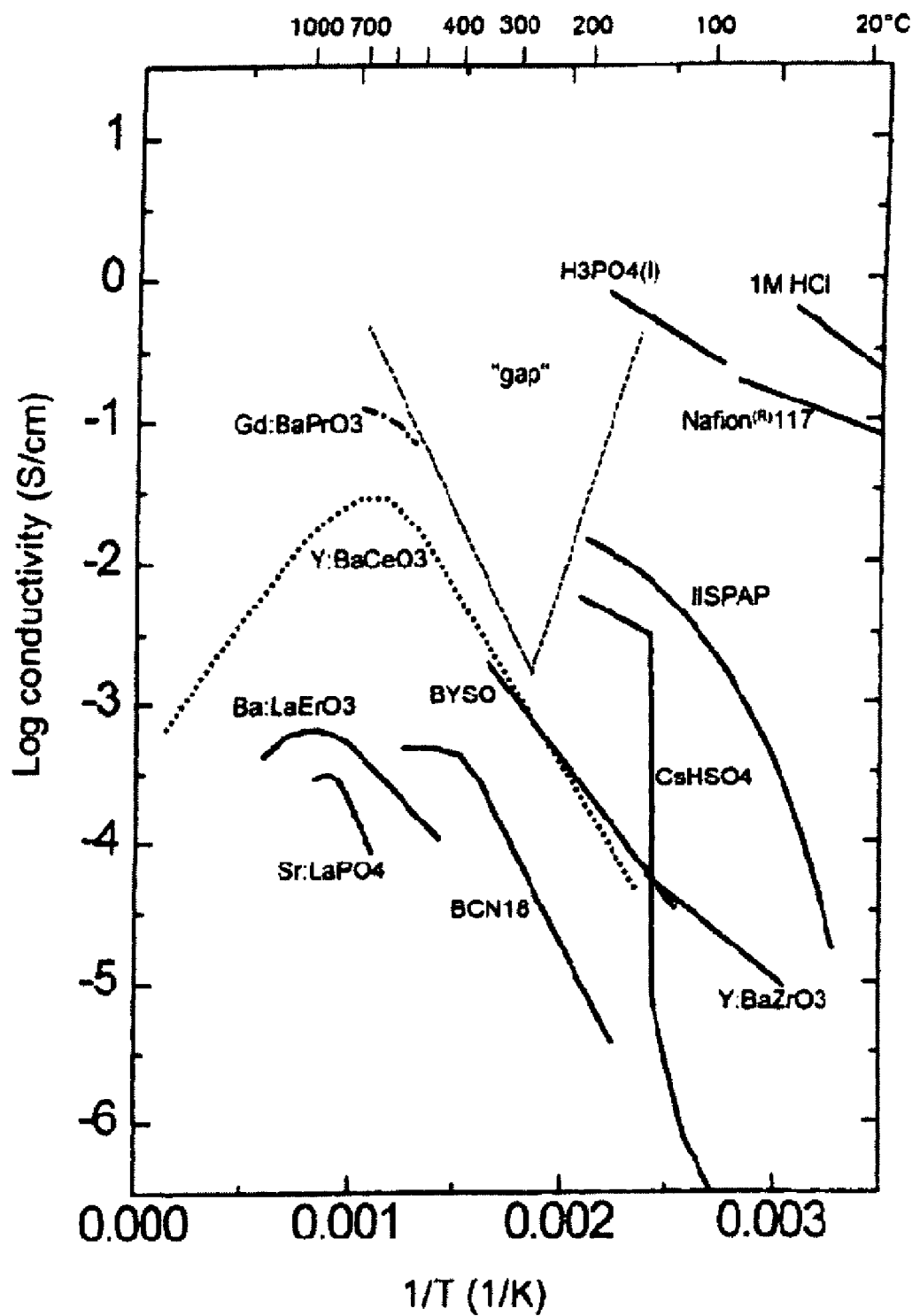
FIG. 1 shows selected data for proton conductivity as a function of inverse temperature for some materials.

As used herein, the term "proton conductor" refers to any body capable of conducting protons. The body could be a single material or a composite material. A composite material is a materials system composed of a mixture or combination of two or more macro constituents differing in form and/or material composition and that are essentially insoluble in each other.

For purposes of this invention, a MEA comprises at least an electrode layer, e.g., an anode or a cathode, where a chemical entity is oxidized or reduced respectively, and a counter electrode, e.g., a cathode or an anode, where an oxidant is reduced or a fuel is oxidized respectively. The MEA also has an EIPC, which conducts protons, but not electrons. The EIPC of this invention could be a separate component of the MEA or incorporated into a graded layer that is electronically insulating yet proton conductive on one face and a mixed electronic-protonic conductor on the opposite face. The mixed conductor region would serve as the catalytic region and the electronically insulating region would serve as the electrolyte or EIPC. A catalytic layer would be supported on the EIPC side of the graded layer. This would constitute a 2 layer MEA. This two-layer MEA would generally be operated at a high temperature such that one side of the proton conducting composite membrane of the MEA would not require a catalytic layer because the reaction at the uncatalyzed side is facile because of the high temperature. A generic representation for the MEA is: Anode/EIPC/Cathode. A two layer MEA would be one where one of the electrode regions has a gradually changing interface separating the EIPC region from the electrode region. This invention encompasses several embodiments of MEA.

Another embodiment of a two-layer MEA would be an electrode and a counter electrode sandwiched together, wherein the interface between the electrode and counter electrode forms an EIPC. An embodiment of a three-layer system would have an EIPC with catalytic layers of electrode and counter electrode on both sides of the EIPC. The polymer electrolyte fuel cell MEA using Nafion with catalyst layers on both sides of Nafion is an example of a three layer MEA.

In another embodiment, a 5-layer MEA, an anode catalytic layer is supported on an EIPC, which in turn, is supported on a metal hydride foil. The face of the foil opposite the anode can have an EIPC layer deposited on the surface upon which is interfaced the cathode catalytic layer. Another embodiment, a 4-layer MEA, would have the EIPC on only one side of the metal hydride foil.

In general, an MEA is a component of a fuel cell, which includes the electrolyte system sandwiched between an anode and a cathode catalytic layer. The electrolyte system can include a matrix that supports a liquid phase electrolyte, a polymer phase, an inorganic phase that conducts oxide, carbonate or protons. The electrolyte can be a multicomponent system. The anode catalyst could be a high surface area platinum/ruthenium mixed metal catalyst (PtRu) and the cathode could be high surface area Pt black catalyst. The shorthand notation for a MEA having a PtRu anode, an EIPC and a Pt cathode is: PtRu/EIPC/Pt.

Different embodiments of this invention, simply by way of illustration of the best mode contemplated for carrying out this invention, are the following.

An electronically insulating proton conductor of a membrane electrode assembly that is capable of converting chemical energy of a reaction into electrical energy at a temperature of about 220° C. to about 550° C. An electronically insulating proton conductor of a membrane electrode assembly that is capable of converting chemical energy of a reaction into electrical energy at a temperature of about 175° C. to about 550° C., the electronically insulating proton conductor containing no acid-containing liquid phase.

A proton conducting composite membrane comprising an electronically insulating proton conductor of a membrane electrode assembly that is capable of converting chemical energy of a reaction into electrical energy at a temperature of about 220° C. to about 550° C. A proton conducting composite membrane comprising an electronically insulating proton conductor of a membrane electrode assembly that is capable of converting chemical energy of a reaction into electrical energy at a temperature of about 175° C. to about 550° C., the electronically insulating proton conductor containing no acid to maintain conductivity.

A membrane electrode assembly comprising an electronically insulating proton conductor and being capable of converting chemical energy of a reaction into electrical energy at a temperature of about 220° C. to about 550° C. A membrane electrode assembly comprising an electronically insulating proton conductor and being capable of converting chemical energy of a reaction into electrical energy at a temperature of about 175° C. to about 550° C., the membrane electrode assembly contains no acid to maintain conductivity. The membrane electrode assembly could have an area specific resistance in a range of about 0.01 to about 100 ohm.cm$^2$.

A membrane electrode assembly could comprise a metal hydride support and an electronically insulating proton conductor on the metal hydride support. The electronically insulating proton conductor could be catalyzed.

Another embodiment is a fuel cell comprising an electronically insulating proton conductor, the fuel cell being capable of converting chemical energy of a reaction into electrical energy at a temperature of about 220° C. to about 550° C. Yet another embodiment is a fuel cell comprising an electronically insulating proton conductor, the fuel cell being capable of converting chemical energy of a reaction into electrical energy at a temperature of about 175° C. to about 550° C., the electronically insulating proton conductor containing no acid to maintain conductivity. The fuel cell could include a metal hydride or a mixed conductor capable of conducting electrons and protons. The fuel cell could be capable of reforming a chemical entity into another chemical entity. The fuel cell could comprise a reforming catalyst.

Another embodiment is a fuel cell comprising electrodes and means, responsive to exposure of at least a chemical entity, for converting chemical energy of a reaction into electrical energy at a temperature of about 220° C. to about 550° C. Yet another embodiment is a fuel cell comprising electrodes and means, responsive to exposure of at least a chemical entity, for converting chemical energy of a reaction into electrical energy at a temperature of about 175° C. to about 550° C., the electronically insulating proton conductor containing no acid to maintain conductivity. The fuel cell could comprise a membrane electrode assembly has an area specific resistance of a material having a thickness of about 175 microns and a proton conductivity within the gap of FIG. 1 or FIG. 2.

One embodiment is a system for generating electricity, comprising a fuel reformer and a fuel cell, the fuel cell being capable of converting chemical energy of a reaction into electrical energy at a temperature of about 220° C. to about 550° C. Another embodiment is a system for generating electricity, comprising a fuel reformer and a membrane electrode assembly comprising an electronically insulating proton conductor, the membrane electrode assembly being capable of converting chemical energy of a reaction into electrical energy at a temperature of about 175° C. to about 550° C., the electronically insulating proton conductor containing no acid to maintain conductivity. In the system, the fuel reformer could be a syngas generator. The fuel reformer could comprise a reforming catalyst in the fuel cell and/or an external reformer. The syngas generator is capable of generating hydrogen. The system could further comprise a water gas shift reactor and/or an oxidation unit.

The electronically insulating proton conductor is selected from the group consisting of $Ba_3Ca_{1.18}Nb_{1.82}O_{8.73}$—$H_2O$ (BCN 18); $CsH_2PO_4$ (CDP); $Sr[Zr_{0.9}Y_{0.1}]O_{3-\delta}$ (SZYO); polyphosphate composite containing 19.96 wt % $NH_4^+$, 29.3 wt % P, 1.51 wt % Si; $La_{0.9}Sr_{0.1}Sc_{0.9}Mg_{0.1}O_3$ (LSSM); and $BaCe_{0.9-x}Zr_xM_{0.1}O_{3-\delta}$ where M is Gd or Wd and x=0 to 0.4 (BCZMO). In the proton conducting composite membrane, the metal hydride is selected from the group consisting of Pd, a Pd alloy, V/Ni/Ti, V/Ni, V/Ti, PdAg, PdCu, Ti, $LaNi_5$, TiFe and $CrV_2$. The anode and/or the cathode could comprise a noble metal and/or a non-noble metal. The anode and/or the cathode could comprise a layer capable of allowing diffusion of a gas and conduction of electrons. The layer is selected from the group consisting of a carbon cloth and a metal cloth.

Another embodiment is a method for converting chemical energy of a reaction into electrical energy, comprising exposing an electronically insulating proton conductor to a chemical entity at a temperature of about 220° C. to about 550° C., and generating electromotive force (emf) across the electronically insulating proton conductor. Yet another embodiment is a method for converting chemical energy of a reaction into electrical energy, comprising exposing an electronically insulating proton conductor to a chemical entity at a temperature of about 175° C. to about 550° C., and generating electromotive force (emf) across the electronically insulating proton conductor; wherein the electronically insulating proton conductor contains no acid to maintain conductivity. These methods could further comprise exposing the electronically insulating proton conductor to an oxidant and/or producing a chemical entity by reforming another chemical entity.

Another embodiment is a method for manufacturing a membrane electrode assembly, comprising depositing a precursor of an electronically insulating proton conductor on a mixed conductor capable of conducting electrons and protons and heating the precursor to convert the precursor to the electronically insulating proton conductor, wherein the membrane electrode assembly is capable of converting chemical energy of a reaction into electrical energy at a temperature of about 220° C. to about 550° C. Yet another embodiment is a method for manufacturing a membrane electrode assembly, comprising depositing a precursor of an electronically insulating proton conductor on a mixed conductor capable of conducting electrons and protons and heating the precursor to convert the precursor to the electronically insulating proton conductor, wherein the membrane electrode assembly is capable of converting chemical energy of a reaction into electrical energy at a temperature of about 175° C. to about 550° C., the electronically insulating proton conductor containing no acid to maintain conductivity. The depositing of the precursor is by brush painting or an airbrush method. The mixed conductor is a Pd foil. The heating the precursor is under $NH_3$ atmosphere. The heating is at a temperature in a range from about 100° C. to about 600° C., preferably, about 100° C. to about 400° C.

The methods of manufacturing the MEA could further include preparing the electronically insulating proton conductor, catalyzation of the membrane electrode assembly, wherein the preparing the electronically insulating proton conductor comprises preparing silica particles, preparing a polyphosphate and mixing the silica particles and the polyphosphate to prepare the precursor.

In the products and methods of this invention, the membrane electrode assembly is capable of converting chemical energy of a reaction into electrical energy at a temperature of about X° C. to about Y° C., wherein the Y is greater than the X, and the X and the Y are selected from the group consisting of 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530 and 540.

Also, in the products and methods of this invention, membrane electrode assembly that is capable of converting chemical energy of a reaction into electrical energy at a temperature of about X° C. to about Y° C., wherein the Y is greater than the X, and the X and the Y are selected from the group consisting of 175, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530 and 540, the electronically insulating proton conductor containing no acid-containing liquid phase.

As explained above, a conventional MEA uses Nafion as the EIPC. The proton conductivity of Nafion decreases monotonically as the temperature is increased above 100° C. Conductivity could be maintained by increasing the pressure, thus increasing the boiling point of water and maintaining hydration of the membrane. This is energetically an expensive proposition.

While conventional fuel cells use Nafion or acids which show loss of protonic conductivity within the "gap" region of FIG. 1, the high temperature electrolyte MEA of this invention has the proton conductivity within the "gap" region of FIG. 1 that increases monotonically as the temperature is increased above 100 ° C. Similarly, it is unlike another competing membrane electrolyte, phosphoric acid doped polybenzimidazole (PBI), because while the acid doped PBI is unstable above 250° C. the proton conductivity of the high temperature electrolyte MEA described in this invention continues to increase with temperature up to and above 400° C. A difference between the high temperature electrolyte MEA system described in this invention and Nafion or PBI (both polymer electrolytes) is that the high temperature electrolyte MEA electrolyte does not require (a) humidification that Nafion does or (b) the phosphoric or other free acid that PBI requires to maintain conductivity.

The long-felt need in this art is higher temperature MEAs. MEAs operating at or above 150° C. would mitigate CO poisoning of the anode electrocatalysts. MEAs operating at above 300° C. would obviate the need for the WGS reactors and the preferential oxidation unit. This would yield a much more compact system and permit the introduction of partially reformed methanol into the intermediate temperature fuel cell. High temperature fuel cells are defined in this context as molten carbonate fuel cells operating at 650° C. while low temperature fuel cells are defined as fuel cell operating below 100° C. (e.g. state-of-the-art polymer electrolyte fuel cells). Intermediate temperature fuel cells are the essence of this patent application. For purposes of this application, the preferred intermediate temperature fuel cell regime is 150° C. to 400° C. This temperature regime includes temperatures where internal reforming of methanol could be conducted within the fuel cell flow fields. Partial reforming could be initiated in an external reformer. The advantage of the high temperature electrolyte system is that it obviates the need for the bulky WGS and PROX reactors.

The problem of the inability to prepare robust membranes of EIPC such as those discussed in the Norby reference is solved by the use of a proton conducting support. In this patent application, the support is referred to as component D. Metal hydride foils comprised of materials such as Pd, PdAg, PdCu, Ti, $LaNi_5$, TiFe and $CrV_2$ are very robust and could serve as separators of fuel and oxidant even with significant pressure differentials. These materials reversibly absorb hydrogen. Hydrogen atoms can diffuse from the surface into the bulk and become located in tetrahedral or octahedral interstitial sites. The absorption of hydrogen into the bulk of these materials results in hydride formation. These metal hydride foils are dense phases that permit hydrogen atoms to diffuse across. Since the membranes are electronic conductors, they must be faced off with EIPC layers. However, since the metal hydride foil serves as the support and separator, the requirement of "robust films" for the inorganic EIPC is relaxed. EIPC layers need to prevent the current collectors of the fuel cell from contacting the electronically conducting metal foil (or D component). Thus, the use of the metal hydride foil as a support is an enabler for high temperature EIPC that suffer from the inability to be fabricated into robust membranes. We call metal hydrides proton conductors for the following reason. When protons are discharged from the anode catalytic surface, the protons can chemisorb as hydrogen onto the surface of the metal. In order for the hydride system to maintain neutrality, a proton is ejected from the opposite face of the 2 dimensional foil. The chemisorbed hydrogen can diffuse into the bulk of the metal and diffuse across the foil to the opposite face. As hydrogen diffuse into the bulk, they are replaced by new chemisorbed hydrogen because the anode continues to generate more protons. The protons are generated when molecular hydrogen is stripped of two electrons yielding two protons, which migrate through the membrane electrode assembly, and two electrons, which are delivered to the external circuit. Pd metal has an fcc (face-centered-cubic) structure with a lattice parameter of 0.3887 nanometers. Upon the absorption of hydrogen the lattice expands isotropically retaining its fcc structure. At a low equilibrium pressure of hydrogen, hydrogen dissolves in the dilute α phase. When the H/Pd ratio is 0.015 at 298° K, the Pd becomes a β phase hydride where the lattice parameter is 11% higher than that of the metal. This increased lattice parameter causes the hydrogen diffusivity to increase. Hydrogen diffuses relatively rapidly in Pd. This phenomenon is what enables the use of Pd as a support for the fabrication of composite systems capable of serving as membrane electrode assemblies for fuel cells.

A characteristic of the high temperature electrolyte MEA described in this invention is that is does not require the addition of any liquid phase (e.g. water or free acids) to maintain proton conductivity.

The characteristics of the high temperature electrolyte MEA system could be enumerated as follows:

(1) The conductivity goes up as the temperature is increased above 100° C.

(2) No additional liquids need to be included in order to maintain conductivity.

(1) A High Temperature Membrane Electrolyte Assembly

Figure 3:
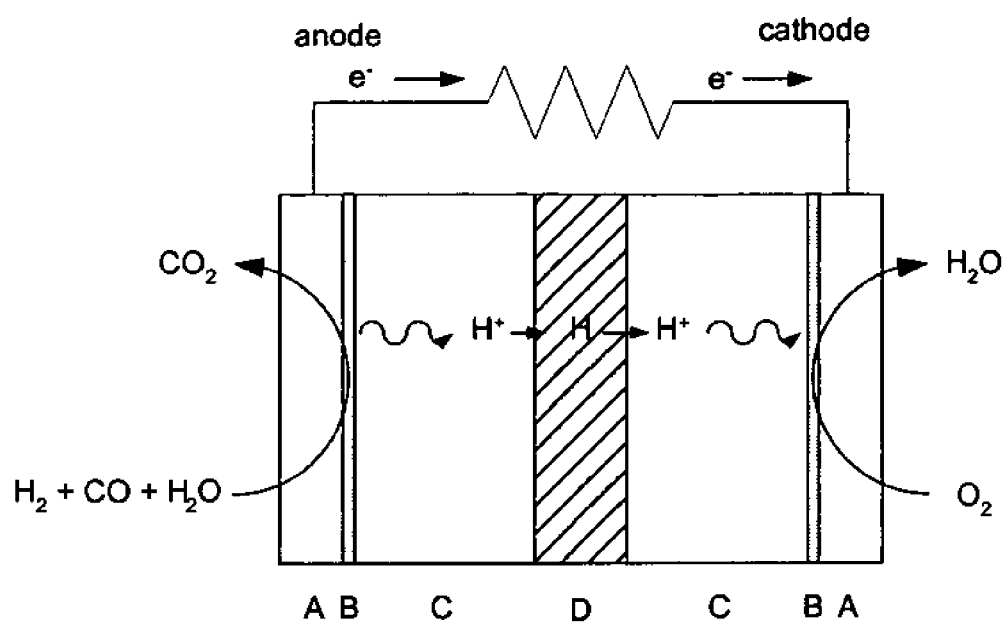
FIG. 3 shows an example of a high temperature electrolyte membrane electrode assembly.
Figure 4:
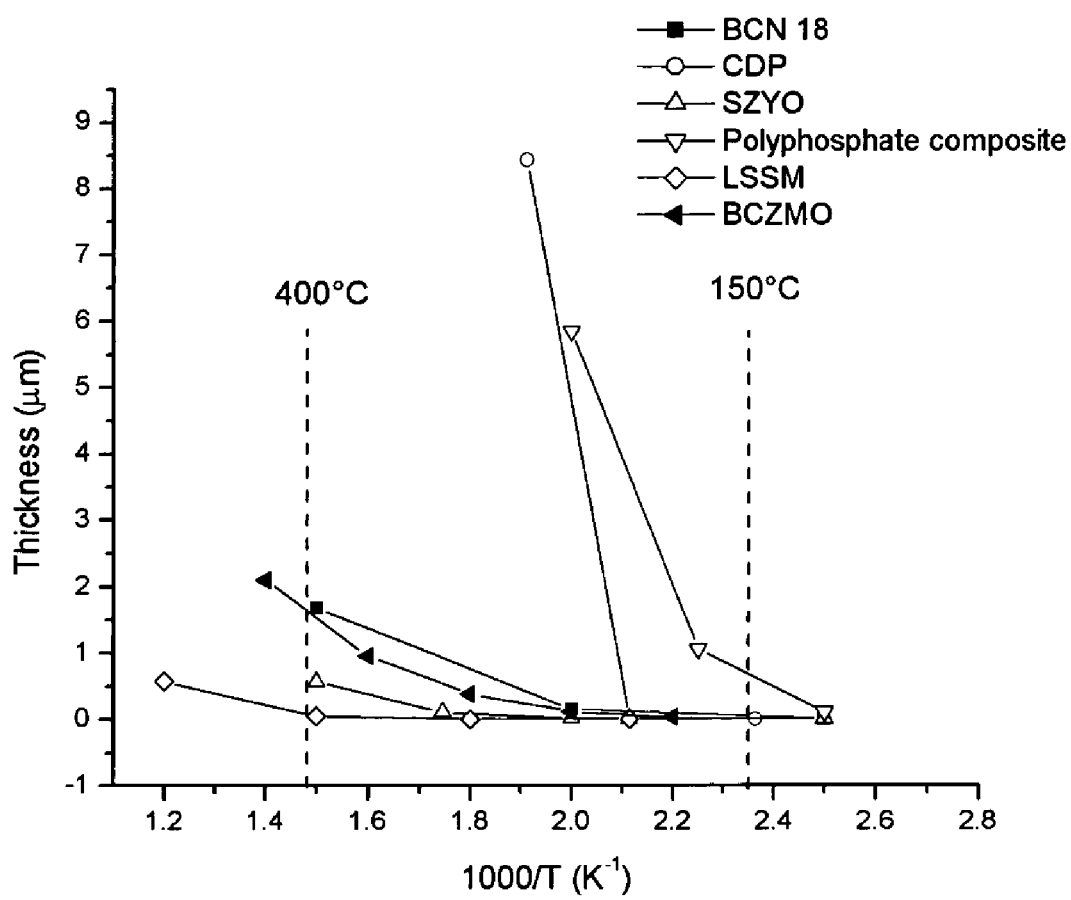
FIG. 4 shows the thickness as a function of inverse temperature of different materials having the proton conductivity equal to that of Nafion 117 at 80° C.

An example of the high temperature electrolyte MEA is shown in FIG. 3, which is a schematic of a non-polymeric intermediate temperature fuel cell. This diagram is not drawn to scale. The Pd foil used for component D was 25 µm thick.

In the above diagram, the composite system, C/D/C constitutes an EIPC. Components C and D are both proton conductors, also called proton conductors. A multiple layer system may be required when component D is also an electronic conductor. The C components are EIPC layers that are interfaced to D in a series fashion. The composite C/D is, overall, an EIPC composite that conducts protons and, therefore, an electronically insulating proton conductor.

In FIG. 3, component A is a porous gas diffusion layer and component B is an electrocatalyst layer. Among the several embodiments of component A that could be used in this invention are carbon papers, carbon cloths, metal screens or any electronically conductive porous material. The purpose of component A is to serve both as a current collector and as a diffusion layer that permits fuel gas to diffuse through to the catalytic layer. Among the several embodiments of component B that could be used in this invention are noble metals such as Pt, Pd, Ru, single phase and mixed phases comprising the above noble metals and nickel, chromium, molybdenum, osmium, rhodium, iridium, rhenium, and single phase and mixed phases comprised of all of the above components.

One embodiment of the high temperature electrolyte is schematized as C/D/C. When the high temperature electrolyte is catalyzed with catalytic layers (B), the assembly is schematized as B/C/D/C/B and would be referred to as an embodiment of MEA.

Another variation would be a bilayer electrolyte system where D is an electronically conducting proton conductor and C is an EIPC. The schematic for such a system would be (a) C/D or (b) D/C where in (a) the anode catalytic layer is in contact with the EIPC layer and in (b) the cathode catalytic layer is in contact with the EIPC. The full MEA schematic for these two options are:

a) $B_{anode}$/C/D/$B_{cathode}$
b) $B_{anode}$/D/C/$B_{cathode}$

In the above two cases, (a) and (b), the composites C/D or D/C are both EIPC composites since the C layer blocks electronic conductivity through the composite.

One method of making high temperature electrolyte MEA shown in FIG. 3 is the following.

First a dense phase proton permeable material must be selected as the "D" component. The term dense phase proton permeable material is any material that is permeable to protons but impermeable to chemical species larger than atomic hydrogen. The support for the EIPC layers is component D. The support is permeable to hydrogen atoms. The support does not have to be an electronic insulator and it is preferable that it is not. The support is permeable to hydrogen and stable to temperatures exceeding 350° C. The support is a two-dimensional stable membrane capable of serving as a support for EIPC materials. If the support is electronically insulating, then no additional EIPC is required. Examples of supports include Pd, Pd alloys, and vanadium alloys.

In one embodiment of this invention, said dense phase proton permeable material comprises a foil of a metal hydride. An example of a metal hydride foil is Pd. Other examples include alloys of Pd (e.g. PdAg alloys) and V/Ni/Ti, V/Ni, V/Ti where V is vanadium, Ni is nickel and Ti is titanium. These materials constitute the D component. The thickness of the D component foil could be in the range of 5 to 1000 µm, preferably about 10 to 200 µm and most preferably in the range of 20 to 100 µm. In one example, the thickness of a Pd foil was 25 µm.

Second, interface a C component to one or both faces of the D component to yield the composite electrolyte system. Selection of the D component is followed by selection of an EIPC material (component C). The component C is then adhered or deposited to one or both faces of the D component yielding a bilayer or tri-layer electrolyte respectively.

An EIPC is any material capable of conducting protons but is electronically insulating. Electronically insulating means that it does not conduct electrons. Low temperature EIPC would include Nafion, phosphoric acid doped PBI, and any proton-conducting polymer. High temperature EIPC are typically inorganic or composites of inorganic materials and polymeric (organic) binders. Examples of inorganic and composite organic/inorganic systems include:

Inorganic Systems with water:
1. Mesoporous zirconium phosphate pyrophosphate $Zr(P_2O_7)_{0.81}$
2. Superprotonic water non-stoichiometric phase of $M_zH_y(AO_4)_{(x+y)} \cdot xH_2O$
3. $Ba_3Ca_{1.18}Nb_{1.82}O_{8.73}$—$H_2O$
4. $Cs_5H_3(SO_4)_4 \cdot 0.5H_2O$
5. Organic-inorganic hybrid (ICS-PPG), composed of 3-isocyanatopropyl-triethoxysilane (ICS) and poly(propylene glycol)bis-(2-amino-propyl ether) (2-APPG), mixed with peroxopolytungstic acid (W-PTA), (W-PTA/ICS-PPG for short)
6. Hydrates of $SnCl_2$ Inorganic Systems without water:
1. Silver iodide tetratungstate $Ag_{26}I_{18}W_4O_{16}$
2. $Cs_{1-x}(NH_4)_xH_2PO_4, Cs_{1-x}(ND_4)_xD_2PO_4$, and $K_{1-x}(NH_4)_xH_2PO_4$
3. $KH_2PO_4$
4. Tetraammonium dihydrogen triselenate, $(NH_4)_4H_2(SeO_4)_3CsDSO_4$ The materials used for the "C" component determine the high temperature limit of operation of the high temperature electrolyte MEA. The material for component could be selected from the group below: $Ba_3Ca_{1.18}Nb_{1.82}O_{8.73}$—$H_2O$ (BCN 18); $CsH_2PO_4$ (CDP); $Sr[Zr_{0.9}Y_{0.1}]O_{3-\delta}$ (SZYO); Polyphosphate Composite containing 19.96 wt % $NH_4^+$, 29.3 wt % P, 1.51 wt % Si; $La_{0.9}Sr_{0.1}Sc_{0.9}Mg_{0.1}O_3$ (LSSM); and $BaCe_{0.9-x}Zr_xM_{0.1}O_{3-\delta}$ where M is Gd or Wd and x=0 to 0.4 (BCZMO). All of these C component materials are capable of operating in the temperature range within the "gap" of FIG. 2.

Figure 2:
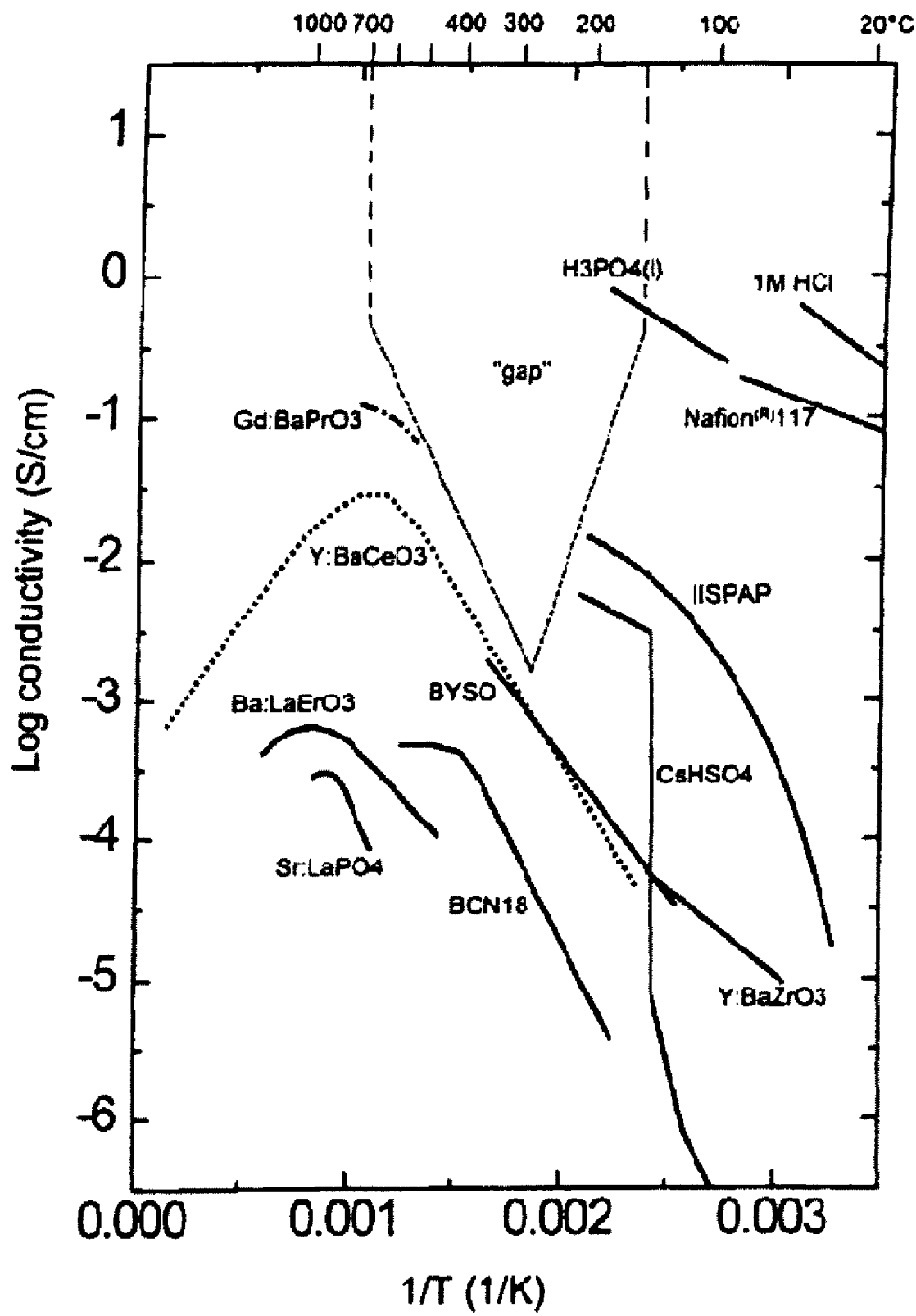
FIG. 2 shows selected data for proton conductivity as a function of inverse temperature for some materials.

The component C is adhered or deposited as a film on component D in a thicknees such that the composite EIPC of C and D has a sufficient proton conductivity within the "gap" region of FIG. 2. The units of conductivity are S/cm where S is Siemens. A Siemen is the reciprical of an ohm (i.e. 1/Ω). The conductivity of a material is an intrinsic property of the material.

The Pd foil would have increasingly higher conductivity as the temperature goes up because the lattice expands and hydrogen permeation would go up. However, whenever one adds a layer in series the resistance always increases. However, if one of the components has significantly higher resistance, than the series resistance is essentially the resistance of the more resistive component. The most resistive component would be the EIPC components. When the component C layer is interfaced to the foil, the composite C/D should be at least as good as Nafion. The calculations give the thicknesses required in order to ensure that. Another way to look at it is as follows. What would happen to the resistance if one adds Pd to the EIPC? At the highest temperature, the increase in resistance would be negligible. At the lowest temperature, the composite resistance would be somewhat higher than the resistance of the EIPC film alone. However, the EPIC would be the limiting resistor at a temperature within the "gap" region of FIGS. 1 and 2 when fuel with a high partial pressure of hydrogen is delivered to the anode stream of the fuel cell containing the composite C/D.

The EIPC material, i.e., component C, is interfaced to the metal hydride foil serving as component D. The EIPC material could be dispersed in a volatile solvent along with a binder material. The binder material could be inorganic or organic. Polybenzimidazole (PBI) is stable to above 300° C. when it is not imbibed with phosphoric acid. A solubilized PBI polymer could be included in the EIPC dispersion. The dispersion is referred to as the EIPC ink. The ink is applied to the metal hydride foil and the composite is heat-treated. The ink preparation could be optimized for each EIPC selected and for each D component selected. Alternatively, an EIPC layer can be vapor deposited onto the surface of the D component. The vapor deposition methods used include vacuum deposition methods as well as atmospheric pressure deposition methods.

The electrolyte system is then catalyzed on both faces of the electrolyte system. After the bilayer or tri-layer composite system is prepared, the outer surfaces are catalyzed with an anode catalyst for the fuel side and a cathode catalyst on the oxidant side. Anode materials could include noble metals, alloys of noble metals, and mixed phase mixed metal catalysts. The cathode side could include noble metals, mixed metal catalysts, transition metal catalysts, ruthenates, pyrochlores and other catalytic materials.

Figure 5:
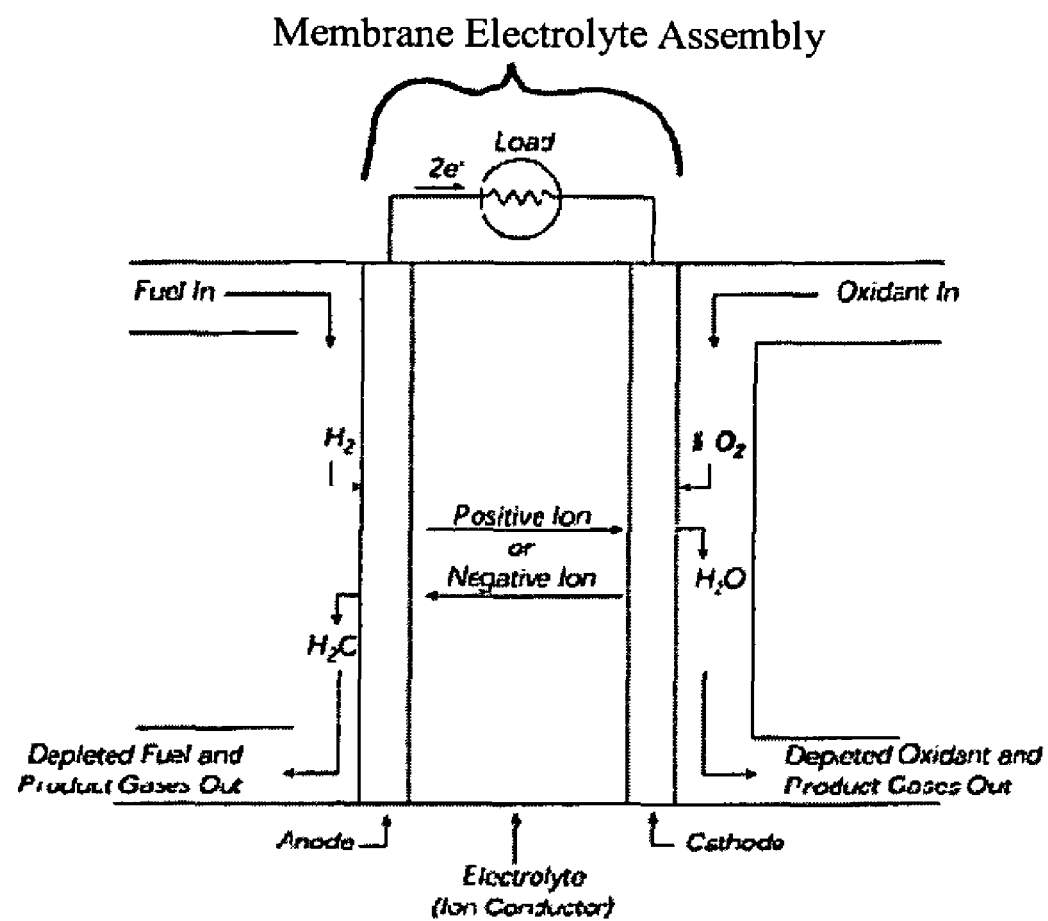
FIG. 5 shows an example of a fuel cell with a membrane electrode assembly.

The result is an MEA system, whose use and performance are now described below by using the MEA system in a partial reformate fuel cell shown in FIG. 5.

(2) Partial Reformate Fuel Cell

The above-mentioned MEA could then be directly incorporated into a fuel cell. The use of high temperature C components affords a high temperature membrane electrode assembly referred to in this application as a high temperature electrolyte MEA system. The metal hydride D component is not a limiting factor with respect to temperature as this material could withstand higher temperatures than the C component (e.g. greater than 1000° C.).

The basic physical structure or building block of a fuel cell consists of an electrolyte layer in contact with a porous anode and cathode on opposite faces of the electrolyte system. A schematic representation of a fuel cell with the reactant/product gases and the ion conduction flow directions through the cell is shown in FIG. 5. In a typical fuel cell, gaseous fuels are fed continuously to the anode (negative electrode) compartment and an oxidant (i.e., oxygen from air) is fed continuously to the cathode (positive electrode) compartment; the electrochemical reactions take place at the electrodes to produce an electric current.

The MEA is incorporated into fuel cell hardware. The hardware could consist of bipolar plates with fuel plenum on the anode side and air plenum on the cathode side. These plates are electronically conductive plates that have grooves (i.e. flow fields) that serve to direct fuel and oxidant to the anode and cathode respectively. In addition these plates conduct electricity through to the next cell in series in the stack. The lands of the flow fields (also known as the outermost, or highest surface of the flow field) contact the gas diffusion layer (e.g. component A of FIG. 3. The A components then contact the catalytic layers (B layers). The catalytic layers contact either a C layer or the D layer directly. Further details on fuel cell hardware could be obtained from the Fuel Cell Handbook, 4$^{th}$ Ed. Published by the U.S. Department of Energy, Office of Fossil Energy, Federal Energy Technology Center, Morgantown, W.Va./Pittsburgh, Pa. available at www.fetc.doe.gov, which is incorporated herein by reference.

The modes in which the high temperature electrolyte MEA could be used include the following:

(1) In a stand-alone fuel cell or fuel cell stack.

(2) In a fuel cell with reforming catalysts in the flow fields of the bipolar plates.

(3) In a fuel cell thermally integrated with an external reformer having a reformer, a preferential oxidation unit and a water gas shift reactor.

(4) In a fuel cell thermally integrated with only a reformer.

(5) In a fuel cell with reforming catalysts in the flow fields in combination with an external fuel processor where a fuel processor comprises a reformer, water-gas-shifter and preferential oxidation unit.

(6) Regenerative fuel cells.

(7) Electrochemical organic chemical transformation reactors.

Fuel cells using a higher temperature electrolyte will outperform the state-of-the-art polymer electrolyte fuel cells because the temperature of operation is higher. The higher temperature operation will improve the performance of the cathode side because the cathode kinetics (oxygen reduction) improves with increased temperature. This is a characteristic of Arrhenius kinetics. Also, the anode performance would improve because CO poisoning of the anode catalyst is mitigated by the higher temperature operation. When C components are used that are stable to temperatures above 250° C., methanol could be reformed directly in the fuel cell as well as in an external reformer. Since the fuel cell operates at higher temperature, thermal integration of the fuel cell with the fuel processor (e.g. the methanol reformer) is facilitated. When the fuel cell operates at 150° C., CO poisoning is mitigated, but internal reforming is not an option.

A fuel cell of one embodiment of this invention is shown in FIG. 6.

The preparation of the components of the fuel cell and the performance of a fuel cell of one embodiment of this invention are now described below.

(A) Preparation of EIPC

The components of the EIPC are ammonium polyphosphate and silica. The ammonium polyphosphate and the silica are separately prepared and then blended to form a composite EIPC material as described below.

(i) Preparation of Silica

The preparation of silica particles is based on the chemical reaction of tetraesters of silicic acid (tetraalkyl silicates) in solutions comprising methanol or ethanol or other alcohols. The formation of silica particles by reacting tetraethyl silicate in alcoholic solution with water in the presence of certain bases is described in Kolbe, G., "Das komplexchemische Verhalten der Kieselsaure," Dissertation, Jena (1956). The method employed in this embodiment is the Stober-Fink-Bohn method described in Werner Stober, Arthur Fink and Ernst Bohn, "Controlled Growth of Monodisperse Silica Spheres in the Micron Size Range", Journal of Colloid and Interface Science 26, 62-69 (1968).

The reagents required for making the silica of one embodiment of this invention were the following:

Methanol, ethanol, n-propanol and n-butanol, which are of analytic reagent quality and used as solvents;

tetraesters of silicic acid (tetraalkyl silicates) of technical grade (e.g. tetramethyl silicate, tetraethyl silicate, etc);

anhydrous ammonia (99.9% purity); and ammonium hydroxide, 26° Be (Baumé (density scale)) USP grade (United States Pharmacopeia grade).

Pure alcohol or alcohol mixtures, saturated alcoholic ammonia solution, ammonium hydroxide and water were mixed in an Erlenmeyer flask (reaction vessel) with ground stoppers or in rubber sealed injection bottles in the desired concentrations of ammonia and water. 1 Molar~10 Molar Ammonia was used as a catalyst for causing the formation of spherical particles of silica. It was added to the alcohol mixtures by adding saturated alcoholic solutions of ammonia to the reaction vessel. When high ammonia concentrations were desired in the alcohol mixtures, saturated ammonium hydroxide solution was used. The concentration of ammonia in the alcohol mixture was measured by withdrawing small samples and titrating with 1N hydrochloric acid. Total water contents were computed by adding up the fractional amounts of water introduced by all of the components in the reaction vessel.

Figure 7:
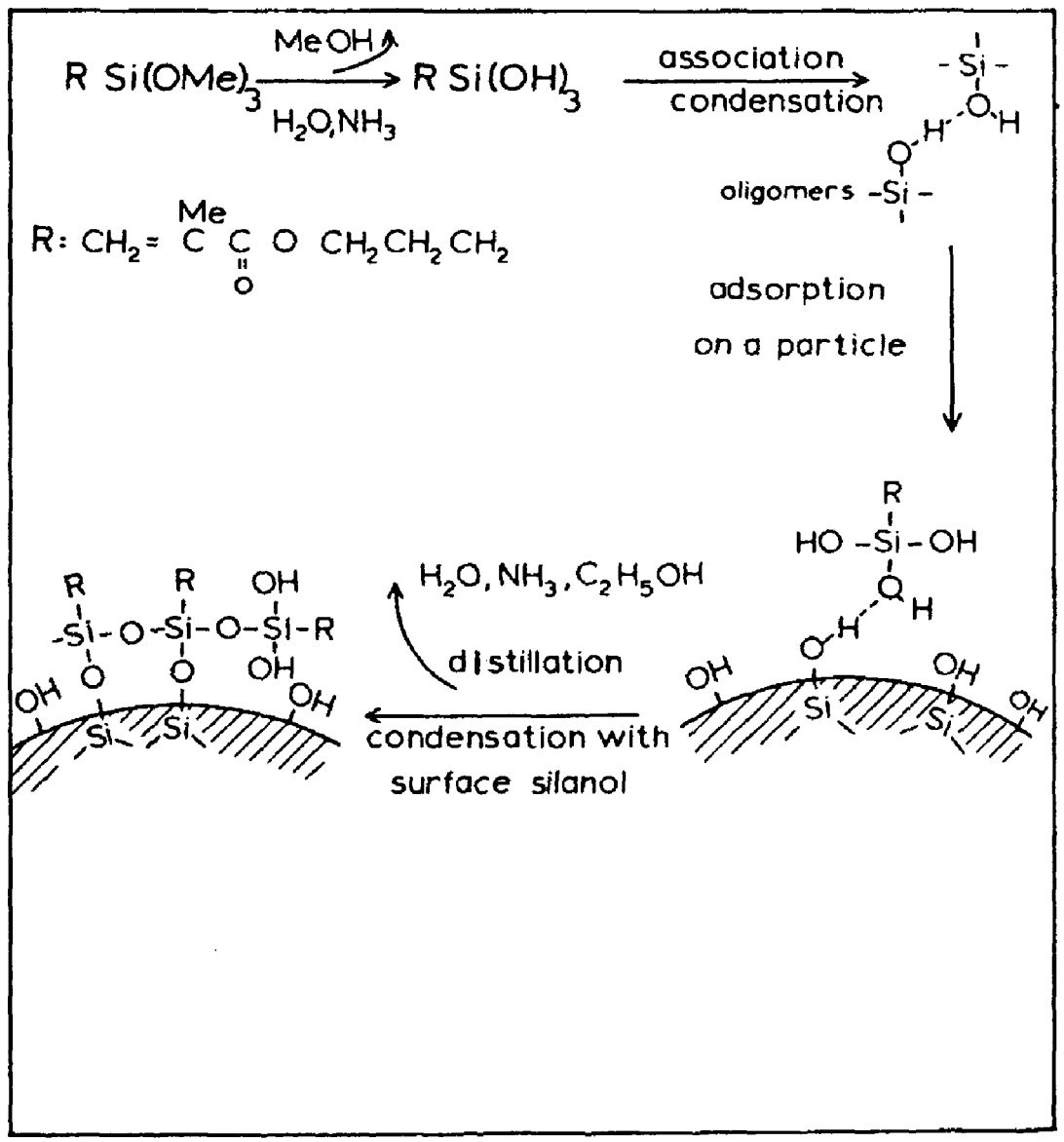
FIG. 7 shows a schematic of the reactions involved in the preparation of the silica particles of one embodiment of this invention.

Subsequently, alkyl silicate was added to the reaction vessel mounted either on a shaker or in an ultrasonic water bath. After an initial phase where an invisible hydrolytic reaction forming silicic acid occurs, a second phase, the condensation of the supersaturated silicic acid was indicated by an increasing opalescence of the mixture starting 1-5 minutes after adding the tetraalkyl silicate. A schematic of the process illustrating the first and second phase of the reaction are shown in FIG. 7. The white suspension of silica particles is then filtered from the solution.

(ii) Preparation of Ammonium Polyphosphate

Phosphorous Pentoxide of 98+% purity, ACS (American Chemical Society) grade, was added to phosphoric acid (85% weight %, ACS grade), 10 grams of phosphorus pentoxide ($P_2O_5$) and 4.64 ml of phosphoric acid were mixed in a 250 ml beaker at room temperature. 4.64 ml of phosphoric acid was based on the following calculations:

Number of moles of 98% pure $P_2O_5 = (10*0.98)/142 = 0.069$ moles.

Number of moles of phosphoric acid=0.069 moles;
Basicity of phosphoric acid=3
Normality of phosphoric acid is known to be 44.6N
Molarity of phosphoric acid=44.6/3=14.866M=14.866 mols/liter
Volume of phosphoric acid to be taken=0.069/14.866=4.64 ml A magnetic stirrer bar was inserted into the beaker. An oil bath (DirecTorr Gold Vacuum Pump Oil—Welch, vapor pressure @25° C. is $5*10^{-7}$ Torr) was prepared on a hotplate and maintained at 200° C. The beaker with the $P_2O_5$ and phosphoric acid mixture was placed in the bath and stirred continuously until all the $P_2O_5$ dissolves completely to form polyphosphoric acid ($HPO_3$). The temperature of the bath was decreased to 150° C. and an excess amount of urea of 99%+ purity, ACS grade, in the mole ratio of 2:1 urea and polyphosphoric acid, was added slowly to the beaker with continuous stirring. The addition of urea was done slowly over a period of about 45 minutes so that there was no froth formation due to the liberation of $CO_2$. Crude polyphosphate was formed in the beaker.

The crude polyphosphate was purified as follows. The crude polyphosphate was dissolved in hot water, which was then cooled to room temperature. An equal volume of methanol was added to precipitate the polyphosphate. White crystals of polyphosphate separated out in about 1 hour and were filtered out using a Millipore filter pump (Micron Separations Inc. Magna Nylon, Supported Plain, 0.45 Micron filter papers). The white powder was vacuum-dried at about 120° C. for 2 hours and then sintered in a tube furnace (Thermolyne, Model #21100) in an ammonia atmosphere at 300° C. for 20 hours to complete the reaction of any residual polyacid into ammonium polyphosphate. X-ray diffraction pattern of the final product confirmed it to be ammonium polyphosphate.

(B) Preparation of EIPC

The EIPC of one embodiment of this invention is a composite obtained by melting a mixture of polyphosphate and nanoscaled (490 nm) silica at 400° C. for 20 hours in ammonia atmosphere.

(C) Preparation of MEA

Figure 8:
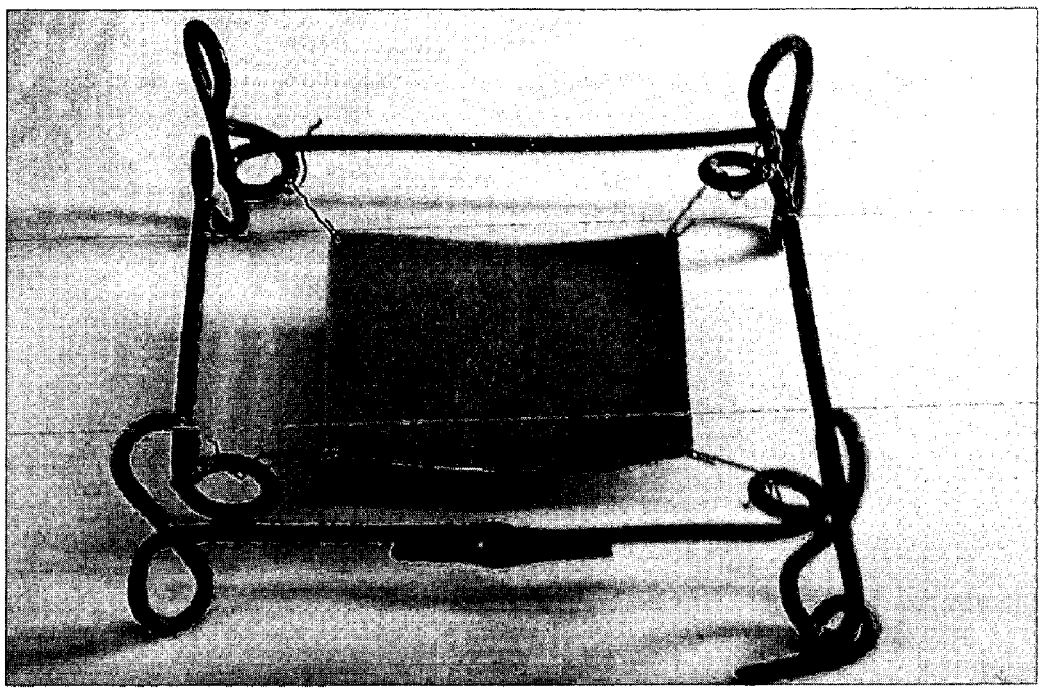
FIG. 8 shows a Pd foil, with five layers of EIPC on one side, hung on a frame stand after 20 hour baking under $NH_3$ atmosphere.

In one embodiment, the MEA comprises an electrochemically treated Pd foil to which the EIPC is deposited on the cathode side. FIG. 8 shows a Pd foil, with five layers of EIPC on one side, hung on a frame stand after 20 hour baking under $NH_3$ atmosphere. This embodiment is designated as Pd/EIPC. The Pd/EIPC is then sandwiched between two catalyzed gas diffusion layers as shown in FIG. 6.

(i) Preparation of the Pd Foil

Palladium foil of 0.001-inch thickness obtained from Johnson Matthey was cut into a square piece of size 3.5×3.5 $cm^2$. Then it was flamed using a hydrogen torch and pressed between two stainless steel sheets using a Carver press with 1800 lb-force to make the foil soft and flat. Four small holes were punched at the corners.

A solution of $PdCl_2$ 50 g/L, $NH_4Cl$ 30 g/L was prepared and HCl was added to make the solution pH 0.1-0.5 as disclosed in "PALLADIUM AND PALLADIUM-ALLOY PLATING" by Ronald J. Morrisey, Editor Michael Murphy, *METAL FINISHING* 2000 *Guidebook and Directory Issue*, January 200, Volume 98, Number 1, pp 289-290.

The Pd foil was hung onto a hook made of a Pd wire, which also served as a working electrode lead, and submerged into the Pd solution. Another Pd wire was used as the counter electrode. A plating current of 0.1 A for 20 seconds was applied on either side of the Pd foil using potentiostat (VersaStat™ from EG&G Princeton Applied Research).

The palladized foil was rinsed and hung onto a homemade frame stand at four corners by thin copper wire to prevent foil from curling during the heating process.

(ii) Deposition of the EIPC Upon the Cathode Side of the Foil

EIPC and silica gel were mixed at a mole ratio of 4:1. The ratio of 4:1 was based on the stoichiometric ratio of the reaction:

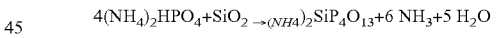

$4(NH_4)_2HPO_4 + SiO_2 \rightarrow {}_{(NH4)_2}SiP_4O_{13} + 6\ NH_3 + 5\ H_2O$ Methanol was added and the suspension was constantly stirred to prevent the EIPC and silica from settling. The suspension was airbrushed using Aztek, model A320, airbrushing equipment onto one side of the Pd foil under an infrared lamp so that methanol could be evaporated away quickly and EIPC and silica gel be dispersed evenly across the Pd foil.

After one layer of EIPC was dispersed, the Pd foil was baked in an oven under $NH_3$ atmosphere at 400° C. for two hours and then cooled down to room temperature. Then a second layer was airbrushed onto the first layer and then sintered in ammonia at 400° C. for 2 hours. This process was repeated until 4 layers were sprayed. After the fifth layer was applied, the Pd foil was subjected to a final bake under $NH_3$ atmosphere at 400° C. for 20 hours. Then it was lowered to 300° C. for one hour, 200° C. for one hour, 100° C. for one hour and finally to room temperature.

(iii) Catalyzation of the EIPC Deposited Pd foil

The Pd foil was sandwiched between two high temperature PTFE gaskets obtained from Dewal industry, RI. Platinum ink (Pt ink), made by mixing Pt black obtained from Johnson Matthey, fuel cell grade, and 10 wt % of EIPC powder with isopropanol, was sprayed onto the EIPC layer side of Pd foil.

Pt black is highly dispersed unsupported platinum particles with a typical surface area of 65 m² per gram of platinum.

(iv) Catalyzation of the Gas Diffusion Layers

Elat is a trade name for a brand of carbon cloth. Double sided Elat (E-Tek, Inc.) was cut into squares 2 cm on edge. The total area of the squares is 4 cm² Double sided Elat is a commercially available gas diffusion electrode. It consists of a pain weave carbon cloth of 3.4 oz/yd² (116 g/cm²). The thickness of this cloth was 0.36 mm. The side of the GDL that faces the gas side is wet-proofed by means of a hydrophobic fluorocarbon/carbon layer. The commercially available Elat was then modified as follows. Pt ink was then painted onto one side of two double-sided Elat (E-Tek, Inc.) whose sizes were 4 cm² each. Each double-sided Elat was dried in the oven at a temperature of 120° C. for 1 hour to produce a catalyzed gas diffusion layer (GDL).

(C) Fuel Cell Testing (i) Assembly of the Fuel Cell

Two catalyzed GDL were placed in the window of the gasket with the catalyzed side in contact with Pd/EIPC. The Pd/EIPC is sandwiched between two catalyzed GDL, yielding a structure designated as GDL/Pd/EIPC/GDL. This sandwich assembly is then inserted and sandwiched between the PTFE gaskets with the window of the PTFE gaskets exposing the GDL regions as shown in FIG. 6. The assembly comprising PTFE/GDL/Pd/EIPC/GDL/PTFE is then inserted between two graphite blocks with flow fields cut into the surface (see the end blocks of FIG. 6) to form a fuel cell assembly. Each graphite block is referred to as a flow field (FF). The fuel cell is designated as FF/PTFE/GDL/Pd/EIPC/GDL/PTFE/FF. The fuel cell flow field graphite blocks are fixed into appropriate positions by the use of two cylinders as alignment pins. The EIPC was located on the cathode side.

(ii) Operation of the Fuel Cell

The fuel cell assembly was placed in a hot press (Carver Inc., Model C) with heated platens and was pressed so that the fuel cell blocks just touched the hot plates. Two sheets of Kapton (tradename for polyimide) were used to electrically insulate the graphite flow channels from the hot press plates.

A hydrogen and oxygen stream comprising 100 standard cubic centimeters per minute (sccm) of hydrogen and 180-sccm oxygen was used as the fuel stream. The fuel stream was humidified at the temperature of the spargers. Prior to entering the fuel cell assembly by passing the fuel stream through containers of water. These containers were called spargers. A sparger is a container that is filled with water. Gas is introduced into the water through a frit. The purpose of the frit is to disperse the gas into the water via the formation of small bubbles. The gas then exits the sparger and is then delivered to a reactor. The purpose of the sparger is to saturate the gas with water. The anode and cathode spargers were preheated to 70° C. and the gas flow rates through the spargers were 50 standard cubic centimeters per minute (sccm).

The operation of the fuel cell for Tests (1) and (2), explained below, was as follows. Nitrogen was first passed to both anode and cathode flow fields through the spargers. An air pre-heater was also used between the spargers and the fuel cell that was heated to 100° C. initially. The hot plates on the anode and cathode sides of the fuel cell were heated to 100° C. and then to 200° C. and a force of 50 lbs was applied to the external surfaces of the fuel cell flow field blocks.

Test (1): The oxygen pre-heater was maintained at 250° C. Once a steady state temperature for the graphite anode and cathode flow field plates was achieved at 200° C., the fuel and oxidant stream of hydrogen and oxygen was delivered to the anode and cathode of the fuel cell respectively using a Unit Instruments Series 7000 Mass flow controllers and a DX-5 digital control unit. The Unit Instruments Mass flow controller and the DX-5 digital control unit were purchased from Unit Instruments, Inc, Yorba Linda, Calif.

Test (2): The oxygen preheater was maintained at 250° C. Once a steady state temperature for the graphite anode and cathode flow field blocks was attained at 250° C. the fuel cell performance data were obtained as in test 1, with the exception that the cell temperature was 250° C.

Fuel Cell polarization experiments were done for both Tests (1) and (2) with an Autolab (EchoChemie B.V.) PGSTAT20 potentiostat. The current versus voltage curves were recorded at a cell temperature of 200° C. (test 1) and 250° C. (test 2) by applying various potentials between 0.7 V and 0.1 V for a time period of 60 s at each potential. The following figure shows the I-V polarization curve at 200° C. and 250° C. Hydrogen loses electrons at the anode catalytic surface. Each diatomic molecule of hydrogen loses two electrons and becomes two protons. The two electrons are delivered to the external circuit. The protons pass through the Pd foil and then through the EIPC layer on the cathode side. The electrons go through the external circuit, where work can be performed, and then on to the cathode catalytic surface. At the cathode catalytic surface, protons coming through the MEA, electrons from the external circuit and oxygen from the gas phase all come together to form water. The chemical reaction described above can be described by the following reactions:

Anode Reaction: $H_2 \rightarrow 2H^+ + 2e^-$
Cathode Reaction: $\frac{1}{2} O_2 + 2H^+ + 2e^- \rightarrow H_2O$
Total Reaction: $H_2 + \frac{1}{2} O_2 \rightarrow H_2O$ The driving force for the above reactions is the free energy of reaction for the combustion of methanol with oxygen, which is a spontaneous reaction. The rate of the reaction is described by the current as a function of potential. The performance curves for test 1 and test 2 are sown in FIG. 9.

(D) Fuel Cell Performance Data

Figure 9:
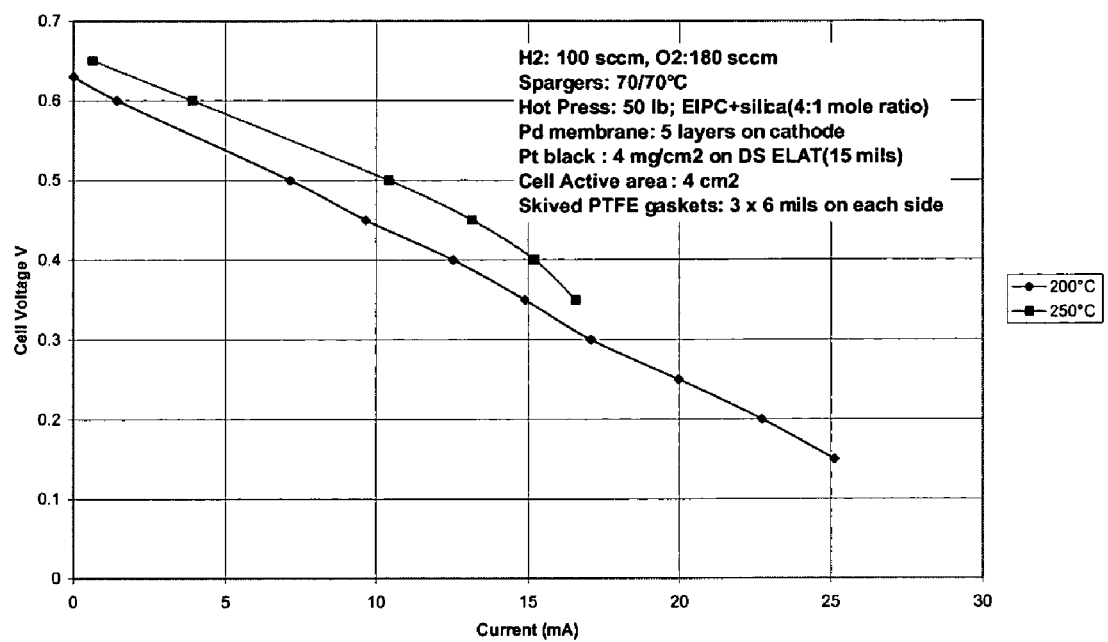
FIG. 9 shows fuel cell performance curves.

FIG. 9 shows fuel cell performance curves. The data demonstrate that this invention is capable of obtaining fuel cell performance curves at temperatures higher than phosphoric acid fuel cells and alkaline fuel cells, yet at temperatures lower than molten carbonate fuel cells. The above data also show that the performance of the MEA improves as the temperature is increased. Prior to this invention, no fuel cell performance curves have been obtained at about 250° C.

The conductivity of the EIPC whose fuel cell performance curve is shown in FIG. 9 is $1.0 \times 10^{-4}$ S/cm. Given the value of the conductivity of the EIPC, a thickness was calculated that would yield a film with a selected area specific resistance (ASR). The criteria used was that the area specific resistance of the MEA should be comparable to the area specific resistance of Nafion at 80° C., which has a proton conductivity similar to that of a material that would be within the gap of FIGS. 1 and 2. The selection of the film thickness of the EIPC such that the MEA has sufficient proton conductivity equivalent to that of Nafion at 80° C. was done as follows.

Conductivity $\sigma$(in $S$/cm)$=L/(RA)$

Where L is the thickness in cm, R is the Resistance in Ω and A is the area in cm².

Area Specific Resistance (ASR) in $\Omega \cdot cm^2 = RA = L/\sigma$

For Nafion 117 at 80° C., the electrolyte resistance is in the order of 30 m Ω on a 5 cm² fuel cell.

Hence, ASR for Nafion 117 at 80° C., under normal fuel cell operation=0.150 Ω·cm²

For the EIPC, the thickness L was determined to satisfy the ASR for Nafion 117 under normal fuel cell operating conditions according to the formula:

$L = (ASR) \cdot \sigma$

Figure 10:
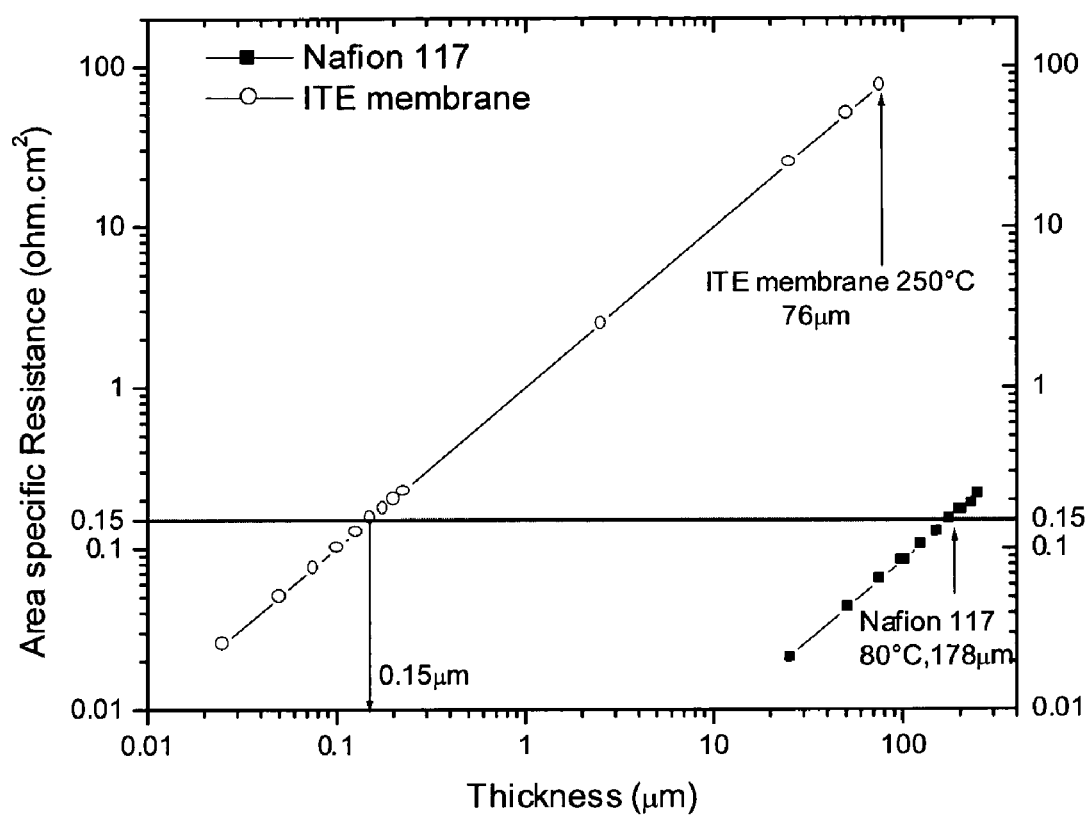
FIG. 10 shows the variation of ASR ($\Omega \cdot cm^2$) with thickness of the EIPC in μm (microns).

FIG. 10 shows the variation of ASR ($\Omega \cdot cm^2$) with thickness of the EIPC in µm (microns) for a Nafion 117 membrane @ 80° C. and the MEA of Test 2, which was tested at 250° C. From the I-V curve of the MEA of Test 2 (FIG. 9), the resistance to proton conductivity was calculated from the slope of the ohmic region as 19 ohms. The ASR for this 76 µm EIPC membrane was calculated to be 75$\Omega \cdot cm^2$. In order to satisfy the criteria that the ASR be similar to Nafion 117 at 80° C., the ASR has to be about 0.150 $\Omega \cdot cm^2$ (as that of Nafion 117 in FIG. 10). By reducing the EIPC membrane thickness of the MEA of Test 2 from 76 µm (Example 1 of FIG. 10) to about 0.15 µm (Example 13 of FIG. 10), this ASR criteria was satisfied as shown in FIG. 10, in which "ITE membrane" refers to MEA of Test 2.

The thickness of the EIPC of the MEA of Test 2 and the corresponding area specific resistance for Examples 1 to 13, which are plotted in FIG. 10, are shown below:

| Example | Thickness | Area Specific Resistance |
|---|---|---|
| Example 1: | Thickness = 76.2 µm; | Area Specific Resistance = 75.97 $\Omega \cdot cm^2$; |
| Example 2: | Thickness = 50.8 µm; | Area Specific Resistance = 50.64 $\Omega \cdot cm^2$; |
| Example 3: | Thickness = 25.4 µm; | Area Specific Resistance = 25.32 $\Omega \cdot cm^2$; |
| Example 4: | Thickness = 2.54 µm; | Area Specific Resistance = 0.253 $\Omega \cdot cm^2$; |
| Example 5: | Thickness = 0.23 µm; | Area Specific Resistance = 0.23 $\Omega \cdot cm^2$; |
| Example 6: | Thickness = 0.203 µm; | Area Specific Resistance = 0.202 $\Omega \cdot cm^2$; |
| Example 7: | Thickness = 0.178 µm; | Area Specific Resistance = 0.177 $\Omega \cdot cm^2$; |
| Example 8: | Thickness = 0.152 µm; | Area Specific Resistance = 0.152 $\Omega \cdot cm^2$; |
| Example 9: | Thickness = 0.127 µm; | Area Specific Resistance = 0.126 $\Omega \cdot cm^2$; |
| Example 10: | Thickness = 0.102 µm; | Area Specific Resistance = 0.101 $\Omega \cdot cm^2$; |
| Example 11: | Thickness = 0.076 µm; | Area Specific Resistance = 0.076 $\Omega \cdot cm^2$; |
| Example 12: | Thickness = 0.051 µm; | Area Specific Resistance = 0.051 $\Omega \cdot cm^2$; and |
| Example 13: | Thickness = 0.025 µm; | Area Specific Resistance = 0.025 $\Omega \cdot cm^2$. |

(3) Partial Reformate Fuel Cell System

Figure 11:
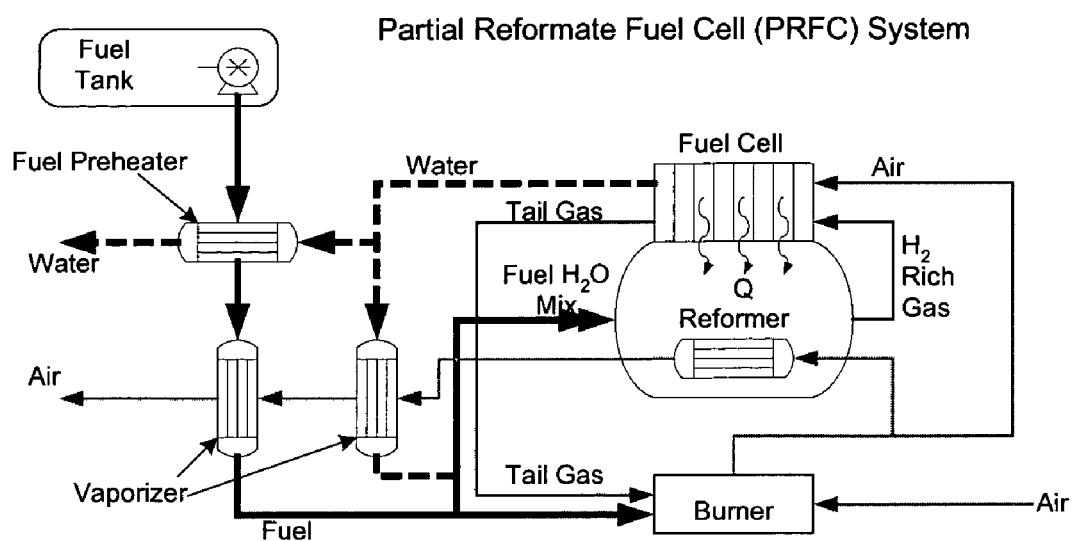
FIG. 11 shows a partial reformate fuel cell system.

FIG. 11 is a schematic of a partial reformate system where the fuel processor is external to the fuel cell. FIG. 11 shows an intermediate temperature fuel cell that delivers heat to the reformer. Note the absence of the WGS and PROX unit. The enabler to the above system is a high temperature membrane electrode structure that could operate at temperatures from 250-400° C. This permits high quality heat to be transferred from the fuel cell to the reformer. The reformer requires heat input because the reforming reaction is endothermic. It is well known that increasing the operating temperature (150-350° C.) of the fuel cell relaxes the catalysis demands. Nickel could be used as an anode catalyst. The advantage of this concept is that the intermediate temperature fuel cell could be thermally integrated with a reformer. At sufficiently high temperatures, methanol, CO and hydrogen are all fuels. The reformer need only produce a sufficiently high partial pressure of hydrogen to load the foil. Thus this system obviates the need for the shifter and the PROX unit. Further, the exothermic fuel cell could reject heat to the reformer.

A partial reformate fuel cell could be made by standard technologies incorporating fuel processors. Since the fuel cell is operated at elevated temperatures, the WGS reactors and PROX unit are removed. The partial reformate fuel cell of this invention would have the high temperature electrolyte system to enable the partial reformer system to operate at elevated fuel cell temperature.

The partial reformate fuel cell of FIG. 10 is used as follows. Methanol and water is delivered to the reformer. The endothermic reformer is heated by burning the unused fuel from the anode tail gas and by heat rejection from the fuel cell to the reformer. Hydrogen, CO and some unreformed methanol exits the reformer and is delivered to the anode plenum of the fuel cell. The hydrogen is oxidized at the anode. The CO will not poison the anode because the temperature is too high. The unoxidized methanol and CO exits the tail gas and serves as combustion fuel, along with the unreacted hydrogen to provide heat to the reformer. There is no precedent for this at the claimed operating temperature range of 250° C. and 400° C. because no MEA operating in this temperature range has previously been introduced.

Internal Reforming

Figure 12:
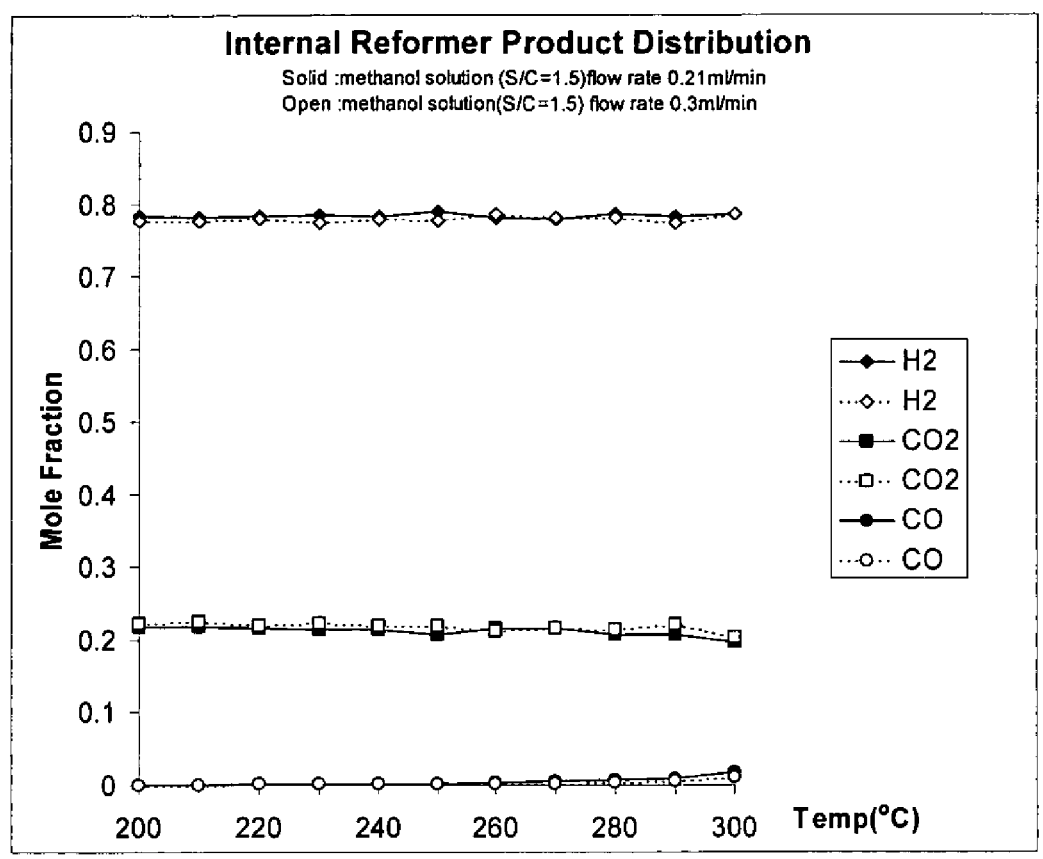
FIG. 12 shows the product distribution by internal reforming in an embodiment of this invention.

Methanol is reformed at temperatures between 250° C. and 350° C. Since the fuel cell of this invention can operate at these temperatures, the catalyst for methanol reforming can be incorporated directly into the flow fields of the anode plenum. Thus aqueous methanol can be delivered to the anode flow field and be converted to hydrogen directly in the flow field. As the hydrogen is then oxidized at the anode the equilibrium for the reforming reaction is shifted to the product side (i.e. more hydrogen is produced as the hydrogen is consumed at the anode. The concept of putting methanol reforming catalysts in the flow field is not new. This strategy is used in the molten carbonate fuel cell industry. In that industry, methane reforming catalysts are incorporated in the anode flow fields. The methane is reformed internally and oxidized at the anode. Attempts have been made to reform methanol internally in polymer electrolyte fuel cells. The results were very poor because the operating temperature was too low. The upper limit of the operating temperature was always determined by the upper limit of the polymer electrolyte. Since the concept of this invention permits the operation of the membrane electrode assembly at even higher temperature, the reforming process kinetics are much improved. Thus the concept of this invention enables the technology of internal reforming for fuel cells within the temperature gap between the molten carbonate fuel cell and the phosphoric acid fuel cell. Data on the reforming process is included in FIG. 12, which shows that the internal reforming output is about the same from 200° C. to 300° C. at two different flow rates of aqueous methanol feed. Almost all of the output can be accounted for by hydrogen and $CO_2$.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

The invention claimed is:

1. A proton-conducting membrane designed to serve as an electrolyte in a fuel cell, which membrane consists essentially of
a single metal or metal hydride support, wherein
one or both faces of said support is coated with an electronically-insulating proton-conducting coating, which coating consists of an inorganic material that contains no liquid phase, said coating having a thickness such that the area-specific resistance for protons is in the range of 0.01-100 $\Omega \cdot cm^2$ at at least one temperature between 220° C. and 550° C.,
wherein the metal or metal in the metal hydride is selected from the group consisting of Pd, PdAg, PdCu, Ti, LaNi$_5$, TiFe and CrV$_2$, V/Ni/Ti, V/Ni and V/Ti.

2. A proton-conducting membrane designed to serve as an electrolyte in a fuel cell, which membrane consists essentially of
a single metal or metal hydride support, wherein
one or both faces of said support is coated with an electronically-insulating proton-conducting coating, which coating consists of an inorganic material that contains no liquid phase, said coating having a thickness such that the area-specific resistance for protons is in the range of 0.01-100 $\Omega \cdot cm^2$ at at least one temperature between 220° C. and 550° C.,
wherein the electronically-insulating proton conductor coating is selected from the group consisting of:
mesoporous zirconium phosphate pyrophosphate, $Zr(P_2O_7)_{0.81}$;
$Ba_3Ca_{1.18}Nb_{1.82}O_{8.73}$—$H_2O$;
$Cs_5H_3(SO_4)_4 \cdot 0.5H_2O$;
a hydrate of $SnCl_2$;
silver iodide tetratungstate $Ag_{26}I_{18}W_4O_{16}$;
$KH_2PO_4$;
tetraammonium dihydrogen triselenate, $(NH_4)_4H_2(SeO_4)_3$;
$CsDSO_4$;
$CsH_2PO_4$;
$Sr[Zr_{0.9}Y_{0.1}]O_{3-\delta}$;
a silica-polyphosphate composite containing ammonium ions;
$La_{0.9}Sr_{0.1}Sc_{0.9}Mg_{0.1}O_3$; and
$BaCe_{0.9-x}Zr_xM_{0.1}O_{3-\delta}$ where M is Gd or Nd and x=0 to 0.4.

3. A proton-conducting membrane designed to serve as an electrolyte in a fuel cell, which membrane consists essentially of
a single metal or metal hydride support, wherein
one or both faces of said support is coated with an electronically-insulating proton-conducting coating, which coating consists of an inorganic material that contains no liquid phase, said coating having a thickness such that the area-specific resistance for protons is in the range of 0.01-100 $\Omega \cdot cm^2$ at least one temperature between 220° C. and 550° C.,
wherein the electronically-insulating proton-conducting coating consists of
$Ba_3Ca_{1.18}Nb_{1.82}O_{8.73}$—$H_2O$;
$CsH_2PO_4$;
$Sr[Zr_{0.9}Y_{0.1}]O_{3-\delta}$;
polyphosphate composite containing 19.96 wt % $NH_4^+$, 29.3 wt % P, 1.51 wt % Si;
$La_{0.9}Sr_{0.1}Sc_{0.9}Mg_{0.1}O_3$; or
$BaCe_{0.9-x}Zr_xM_{0.1}O_{3-\delta}$ where M is Gd or Nd and x =0 to 0.4.

4. A proton-conducting membrane designed to serve as an electrolyte in a fuel cell, which membrane consists essentially of
a single metal or metal hydride support, wherein
one or both faces of said support is coated with an electronically-insulating proton-conducting coating, which coating consists of an inorganic material that contains no liquid phase, said coating having a thickness such that the area-specific resistance for protons at at least one temperature between 220° C. and 550° C. is about $0.150\Omega \cdot cm^2$.

5. A proton-conducting membrane designed to serve as an electrolyte in a fuel cell, which membrane consists essentially of
a single metal or metal hydride support, wherein
one or both faces of said support is coated with an electronically-insulating proton-conducting coating, which coating consists of an inorganic material that contains no liquid phase, said coating having a thickness such that the ASR for protons at at least one temperature between 220° C. and 550° C. is in the range shown for Nafion® 117 in FIG. 10,
wherein the metal or metal in the metal hydride is selected from the group consisting of Pd, PdAg, PdCu, Ti, LaNi$_5$, TiFe and CrV$_2$, V/Ni/Ti, V/Ni and V/Ti.

6. A proton-conducting membrane designed to serve as an electrolyte in a fuel cell, which membrane consists essentially of
a single metal or metal hydride support, wherein
one or both faces of said support is coated with an electronically-insulating proton-conducting coating, which coating consists of an inorganic material that contains no liquid phase, said coating having a thickness such that the ASR for protons at at least one temperature between 220° C. and 550° C. is in the range shown for Nafion® 117 in FIG. 10,
wherein the electronically-insulating proton-conducting coating is selected from the group consisting of:
mesoporous zirconium phosphate pyrophosphate, $Zr(P_2O_7)_{0.81}$;
$Ba_3Ca_{1.18}Nb_{1.82}O_{8.73}$—$H_2O$;
$Cs_5H_3(SO_4)_4 \cdot 0.5H_2O$;
a hydrate of $SnCl_2$;
silver iodide tetratungstate $Ag_{26}I_{18}W_4O_{16}$;
$KH_2PO_4$;
tetraammonium dihydrogen triselenate, $(NH_4)_4H_2(SeO_4)_3$;
$CsDSO_4$;
$CsH_2PO_4$;
$Sr[Zr_{0.9}Y_{0.1}]O_{3-\delta}$;
a silica-polyphosphate composite containing ammonium ions;
$La_{0.9}Sr_{0.1}Sc_{0.9}Mg_{0.1}O_3$; and
$BaCe_{0.9-x}Zr_xM_{0.1}O_{3-\delta}$ where M is Gd or Nd and x=0 to 0.4.

7. A proton-conducting membrane designed to serve as an electrolyte in a fuel cell, which membrane consists essentially of
- a single metal or metal hydride support, wherein
- one or both faces of said support is coated with an electronically-insulating proton-conducting coating, which coating consists of an inorganic material that contains no liquid phase, said coating having a thickness such that the ASR for protons at at least one temperature between 220° C. and 550° C. is in the range shown for Nafion® 117 in FIG. 10,
- wherein the electronically-insulating proton-conducting coating consists of
- $Ba_3Ca_{1.18}Nb_{1.82}O_{8.73}$—$H_2O$;
- $CsH_2PO_4$;
- $Sr[Zr_{0.9}Y_{0.1}]O_{3-\delta}$;
- polyphosphate composite containing 19.96 wt % $NH_4^+$, 29.3 wt % P, 1.51 wt % Si;
- $La_{0.9}Sr_{0.1}Sc_{0.9}Mg_{0.1}O_3$; or
- $BaCe_{0.9-x}Zr_xM_{0.1}O_{3-\delta}$ where M is Gd or Nd and x = 0 to 0.4.

8. A proton-conducting membrane designed to serve as an electrolyte in a fuel cell, which membrane consists essentially of
- a single metal or metal hydride support, wherein
- one or both faces of said support is coated with an electronically-insulating proton-conducting coating, which coating consists of an inorganic material that contains no liquid phase, said coating having a thickness such that the area-specific resistance for protons at at least one temperature between 220° C. and 550° C. is about 0.150 $\Omega \cdot cm^2$ as shown for Nafion® 117 in FIG. 10.

* * * * *